United States Patent [19]
Gurley

[11] Patent Number: 5,036,315
[45] Date of Patent: Jul. 30, 1991

[54] SIMULTANEOUS DISPLAY OF INTERLEAVED WINDOWED VIDEO INFORMATION FROM MULTIPLE ASYNCHRONOUS COMPUTERS ON A SINGLE VIDEO MONITOR

[75] Inventor: James Gurley, San Diego, Calif.
[73] Assignee: Spectragraphics, Inc., San Diego, Calif.
[21] Appl. No.: 241,031
[22] Filed: Sep. 6, 1988
[51] Int. Cl.[5] .............................................. G09G 5/14
[52] U.S. Cl. .................................. 340/721; 340/723; 364/518
[58] Field of Search ................ 340/721, 723; 364/518, 364/521

[56] References Cited

U.S. PATENT DOCUMENTS

| | | | |
|---|---|---|---|
| 4,653,020 | 3/1987 | Cheselka et al. | 340/721 |
| 4,663,617 | 5/1987 | Stockwell | 340/721 |
| 4,736,309 | 4/1988 | Johnson et al. | 340/721 |
| 4,757,441 | 7/1988 | Buckland et al. | 340/721 |
| 4,761,642 | 8/1988 | Huntzinger | 340/723 |
| 4,859,995 | 8/1989 | Hansen et al. | 340/721 |
| 4,890,257 | 12/1989 | Anthias et al. | 340/721 |

*Primary Examiner*—Alvin E. Oberley
*Assistant Examiner*—Richard Hjerpe
*Attorney, Agent, or Firm*—William C. Fuess

[57] ABSTRACT

A first computer workstation running windowed display system and applications programs produces a first video signal of a composite, windowed, display plus a first data signal indicating the dedications, positions, and sizes of all windows. A second computer asynchronously digitally communicates a second display signal to a communications controller and then to a display controller. The display controller also receives the first data signal plus the sync pulse of the first video signal. It produces, from the second display signal, a second video display signal that (i) is synchronized with the first video signal and (ii) contains display information positioned and scaled to be within a window dedicated to the second computer. It produces a switch control signal indicating the portions of each raster scan of the synchronized video signals that are inside and outside the dedicated window. The switch control signal gates in a video switch either the first or the second video signal to a video monitor. The video monitor displays windows showing information from the first computer plus a dedicated window showing information from the second computer.

7 Claims, 20 Drawing Sheets

SYNC DAUGHTERBOARD

FIG. 7b
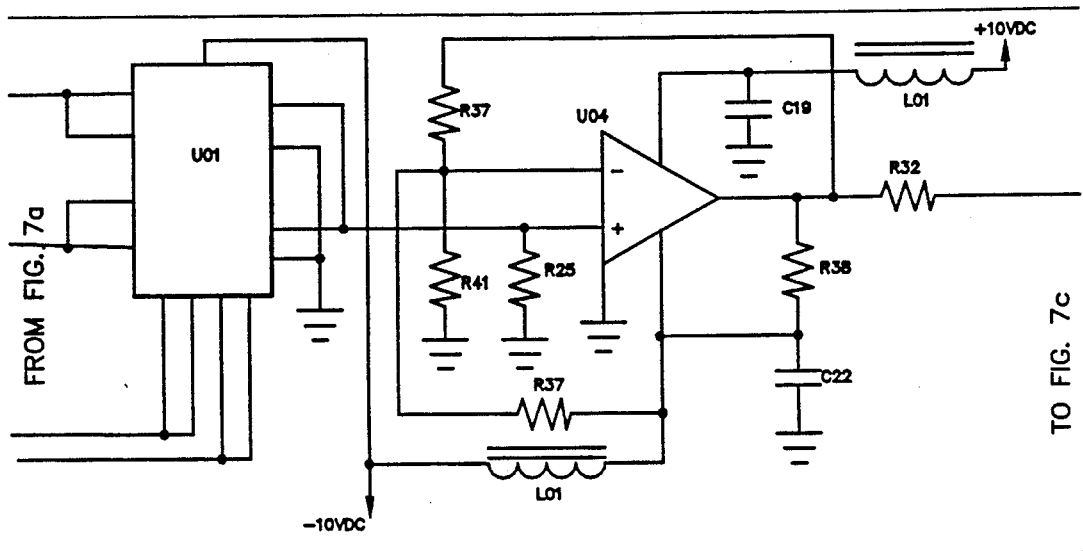
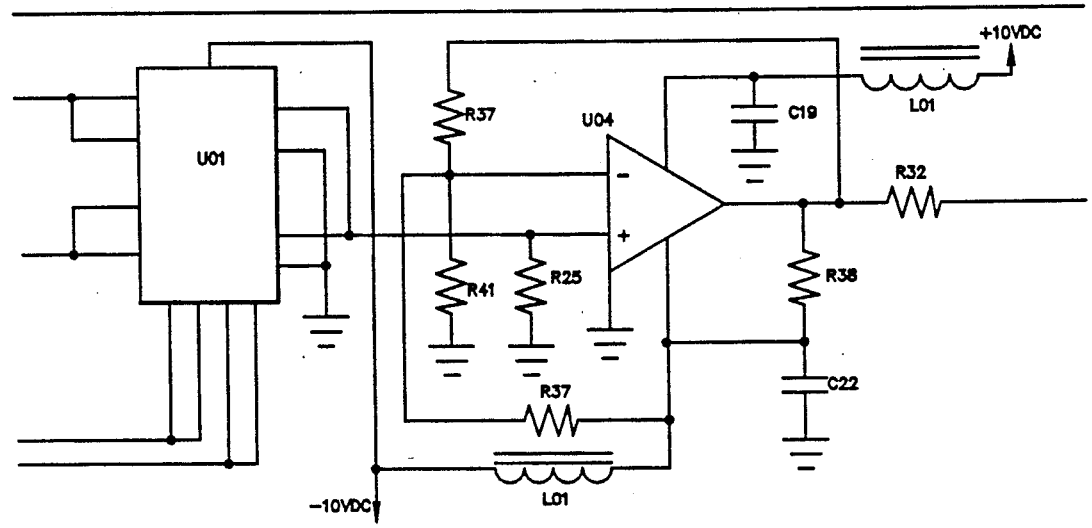
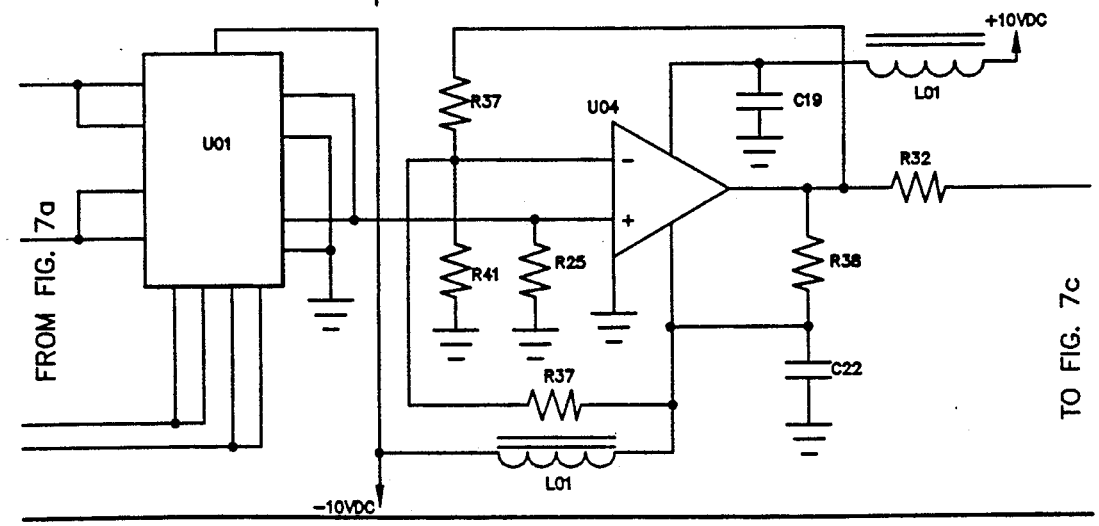

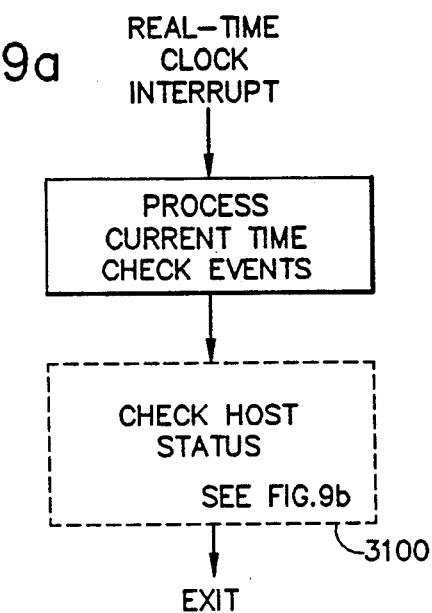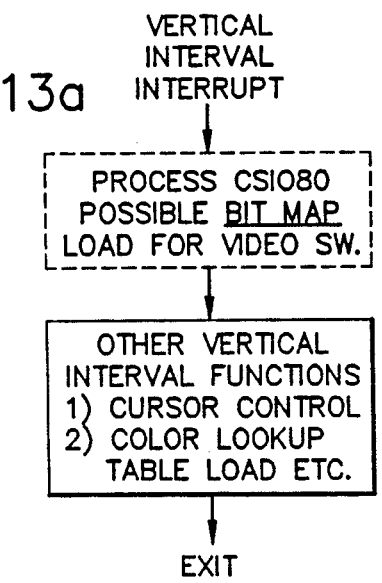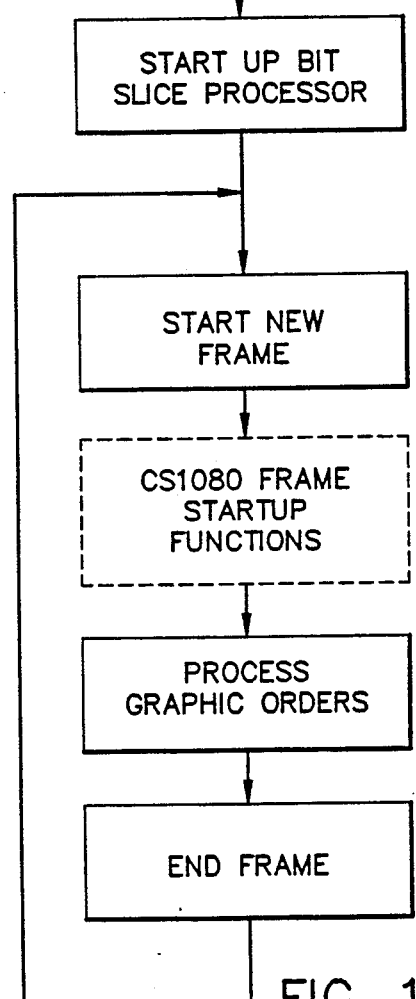

| 7 | 6 | 5 | 4 | 3 | 2 | 1 | 0 |
|---|---|---|---|---|---|---|---|
| / | 0 | 1 | 1 | F | F | F | F |
| / | 1 | D11 | | | | | D6 |
| / | 1 | D5 | | | | | D0 |

FIG. 15A

| 7 | 6 | 5 | 4 | 3 | 2 | 1 | 0 |
|---|---|---|---|---|---|---|---|
| / | 0 | 1 | 0 | D15 | | | D12 |
| / | 1 | D11 | | | | | D6 |
| / | 1 | D5 | | | | | D0 |

FIG. 15B

| 15 | | 13 12 | 11 | | | | 0 |
|---|---|---|---|---|---|---|---|
| W0 | | 00 | | X LEFT | | | |
| 1 | | 01 | | X SIZE | | | |
| 1 | | 10 | | Y TOP | | | |
| L | | 11 | | Y SIZE | | | |

FIG. 15C

SIMULTANEOUS DISPLAY OF INTERLEAVED WINDOWED VIDEO INFORMATION FROM MULTIPLE ASYNCHRONOUS COMPUTERS ON A SINGLE VIDEO MONITOR

BACKGROUND OF THE INVENTION

1. Field of the Invention

The present invention generally concerns computer workstations presenting computer-driven video displays, including video displays of graphics information. The present invention more particularly concerns a computer graphics workstation operating under a windowing software system wherein another computer is simultaneously interfaced to the input peripherals and to the output video monitor of the workstation.

2. Background of the Invention—Existing Software and Hardware Components Are Used Within the System of the Invention The preferred embodiment of the system of the invention will be seen to preferably employ various existing software and hardware components, occasionally with modifications.

A first and a second such existing components used within the preferred embodiment of the invention are two existing computers and their accompanying software systems. The first computer component is preferably a VAXstation II (or other VAXstation family member) available from Digital Equipment Corporation (DEC). The VAXstation® computer workstation (registered trademark of DEC) typically includes a monitor (normally type VR 290), a keyboard (normally type LK 201) and a locator device (normally a mouse). The VAXstation hardware suite runs a software imaging system program, normally either the VMS® or the ULTRIX® (registered trademarks of Digital Equipment Corporation) windowing system programs available from DEC. The combination DEC®(registered trademark of Digital Equipment Corporation) hardware and software suite permits the generation and display of sophisticated graphics in the performance of generalized computer aided design/ computer aided manufacturing (CAD/CAM) operations.

A second standard computer component preferably used in the system of the present invention is a computer of the IBM Corporation, such as a mainframe computer of the type System 360 TM or System 370 TM (trademarks of IBM Corporation). The IBM ® (registered trademark of IBM Corporation) mainframe computer typically runs CAD/CAM software applications programs such as CADAM ® (registered trademark of CADAM, Inc.) or CATIA ® (registered trademark of Dassault Systemes). These mainframe computers and accompanying software programs support graphic displays at graphics terminals, such as at terminal type 5080 available from IBM Corporation, in the performance of CAD/CAM tasks. It will not be necessary in the system of the present invention that the second computer—normally the IBM System 360 or System 370 mainframe—should be running CAD/CAM application software. More mundane software programs such as those performing word processing and other business-related tasks are fully suitable. Any program providing a display will be seen to communicate with a video monitor that is also communicating with the first computer by action of the system of the present invention. The situation wherein an existing VAXstation and an existing IBM mainframe computer are both typically running CAD/CAM applications software merely represents one normal and preferred application of the system of the present invention.

A third existing component used within the system of the present invention is the DesignSet TM Communications Controller (DSCC) of Spectragraphics Corporation, San Diego, Calif. (trademark holder and assignee of the present invention). The DSCC is a multi-processor communication controller that attaches directly to a parallel interface host channel of an IBM, or IBM compatible, mainframe computer. This channel connection permits high speed communication with graphics devices that are further connected to the DSCC. The DSCC minimum configuration includes a Channel Processor (CP), a System Processor (SP) and one Communications Processor (CMP). The CP can emulate 128 virtual control units of the graphic and alphanumeric types concurrently, thereby eliminating overhead otherwise incurred by the mainframe processor in managing shared physical control units. The SP performs management of the initial program load, servicing of display station requests for files from system diskette or disk memory, and diagnostic functions. The CMP supports 16 graphics addresses and 16 addresses for terminals type 3270 (of IBM Corporation). Additional CMP's can be added as dictated by the number of terminal devices in the network. The DSCC may optionally be connected to communications adaptors (CA) of Spectragraphics Corporation for protocol conversion resulting in efficient communication, including via local area networks (LAN's), to remote graphics systems.

For the purposes of the present invention, it should be understood that the existing DSCC (and the DS 1082GXP Display Controller to which it is connected, next discussed) buffer information from a mainframe computer. This information later results in a video display. This buffering effectively permits a decoupling of the signals driving a video monitor, and also of the resulting displays on the video monitor, from any required synchronization with the communication channels of the mainframe computers to which the DSCC and Display Controller connect.

A fourth device used, in a modified form, in the system of the present invention is the Display Controller component of the DesignSet TM 1082GXP TM (trademarks of Spectragraphics Corporation) high-performance graphic system product of Spectragraphics Corporation. The DS 1082GXP graphics system includes, in addition to a Display Controller component, a 16 inch video monitor, a keyboard, and a mouse. These additional, peripheral, components may also optionally be employed within the system of the present invention. If they are so employed then they are in lieu of or supplementary to the equivalent components which normally accompany the VAXstation.

The DS 1082GXP graphics system serves to emulate the 5080 terminal, and optionally additionally the 3270 terminal, of IBM Corporation. For the purposes of the present invention, it need only be understood that the Display Controller of the DS 1082GXP has a digital interface to the DSCC. In response to commands and information received across this interface it produces a standard Red Green Blue (RGB) video output signal which drives the presentation of displays upon a standard video monitor.

Both the DSCC and the Display Controller component of the DS 1082GXP are controlled in operation by resident firmware, or microcode, programs. No modification is required to the firmware control program of the DSCC to support its use in the system of the present invention. A modification and addition to the firmware control program of the Display Controller, as well as a modification to the hardware itself, will be seen to be required to support use of the Display Controller within the system of the present invention.

All of the previously identified hardware and software components are readily available in the commercial market circa 1988. Additionally, suitable substitutionary components from other manufacturers exist.

2.1 Background of the Invention Requirements for the Communication of a Single Graphics Workstation with Multiple Computers There exists a requirement for an integrated solution for permitting access to the applications software of separate computer manufacturers, such as the applications software of computer manufacturers DEC and IBM, from a single computer graphics workstation. The hardware equipments and their corresponding application software packages of the various manufacturers differ significantly in capabilities, capacities, informational contents, supported functionalities, and costs of both procurement and operation. It is often effective and efficient to do a task, such as a complex CAD/CAM design task, on one system while the same task is but poorly or inefficiently performed, or even impossible of performance, upon another system. An engineering design organization operating principally upon one suite of hardware equipments and its accompanying software often encounters situations where it is desirable to display at, and manipulate from, a single workstation the informational data base of another, incompatible, hardware and software suite.

In particular, the VAXstation engineering workstation system of DEC supports the popular VMS and ULTRIX windowing systems. These windowing systems provide a fully defined user, applications level, software interface. Many workstation users in industry circa 1988 program their applications software to reside within this VAXstation environment.

Meanwhile, the System 360 and System 370 mainframe computers available from IBM Corporation perform extensive and powerful CAD/CAM applications software packages such as CADAM and CATIA.

It is cumbersome, and of low cost effectiveness, to use a very large, powerful, and expensive mainframe computer and its accompanying CAD/CAM software of high sophistication to perform certain more mundane design tasks, such as list keeping, that are more efficiently and effectively performed on smaller computerized workstation systems. Alternatively, it is preferred to use the more powerful CAD/CAM application software packages available only on the large scale mainframe computers when the design tasks so require.

The present invention will be seen to reconcile these competing requirements by permitting a single workstation to simultaneously communicate with two or more separate computers, particularly for the conduct of such interactive graphics design activities upon each computer and its accompanying software as is most appropriate to that computer.

SUMMARY OF THE INVENTION

The present invention contemplates a digital computer graphics and communications system wherein two or more computers each cause the simultaneous display of information each within one or more windows appearing upon a single video monitor. Normal manually-directed cursor movement between windows accords communication, typically via keyboard and/or mouse, with that computer that is controlling a particular window within which the cursor is placed. The input and output peripherals of one workstation thus suffice to communicate with two or more computers.

The utility of linking two or more separate computers and their operating software packages—which computer hardware and software may individually and in combination have considerably different capabilities, capacities, informational contents, supported functionalities, and costs—into the formation of a composite display at a single workstation is that i) more versatility is provided while ii) relative differences between the separate hardware and software may be exploited to advantage. It is possible to do tasks, such as complex CAD/CAM design tasks, on two linked computers that are but poorly, inefficiently, or impossibly performed upon one or the other of the computers. Multiple computers' interfaces to one workstation commensurately multiply that workstations' access to existing software and data structures that are upon one of the computers but upon not the other(s).

In accordance with the present invention, all this benefit is obtained without the necessity of tight operational control, or hardware modification, to any of the two or more computers. Instead, the graphics display signal outputs of the two or more separate and independent computers are melded by special hardware that is intermediary between the computers and a single video monitor. The special hardware also permits one set of input peripherals, normally a keyboard and a mouse, to communicate at times with each one of the computers.

The digital computer graphics and communications system in accordance with the present invention intentionally combines and couples selective hardware and software components of existing systems in order to realize, in combination and as occasionally modified, a new function. A first antecedent system to the system of the present invention is a computer workstation that includes a first, system-window-managing, computer. This first computer runs a software program that causes production of a video display signal that provides a windowed display upon a video monitor. Input peripherals such as a keyboard and a mouse communicate with the first computer.

A second antecedent system to the system of the present invention is a computer system that includes a second, host, computer. This second computer runs software producing a display signal that would generate a (typically non-windowed) display if the computer were to be directly connected to a graphics terminal. The display signal from the second computer is digital and not video. It is routed across parallel interface cables to a communications controller, and not directly to a graphics terminal. The communications controller is capable of multiplexing a number of such digital display signals on a number of channels. A selected one of the digital display signals is further digitally communicated from the communications controller to a display controller. The display controller produces a video output signal that causes a display upon a video monitor. The display controller and its associated video monitor jointly emulate a graphics terminal. Input peripherals such as a keyboard and a mouse communicate with the second computer through the display controller and through the communications controller.

In accordance with the present invention the first and the second antecedent systems are combined. Both the first and the second computers and their software are retained. The communications controller and the display controller through which the second computer communicates to generate a display upon a video monitor are both retained. Only one video monitor is retained. Only one set of input peripherals is normally retained.

In accordance with the present invention, the display(s) that is (are) generated by the second, host, computer appears in a particular display window(s) upon the video monitor. The particular window(s) is (are) situated among other display windows that are driven by the first, system-window-managing, computer. This composite display is accomplished by (i) adding two hardware components to existing components of the system, (ii) altering the firmware program control of the display controller, and (iii) adding a software applications program to run under the windowing program within the system-window-managing computer.

The first added hardware component addition is a video switch. The video switch will, under control of a switch control signal, switch between the video signals that are received from (i) the first, system-window-managing, computer, and that are derived from (ii) the second, host, computer via the communications controller and the display controller.

The second added hardware component is a "sync/-window" printed circuit assembly, or daughterboard, that is added to the display controller. This component synchronizes the video signal output that is generated by the display controller from the display signal of the second computer with that video signal output that is generated directly by the first computer. It also produces the switch control signal that controls the operation of the video switch.

The altered firmware program control of the display controller receives upon an interface channel information regarding the dedications, positions and sizes of all display windows from the first, system-window-managing, computer. This information includes the identification, as well as the position(s) and size(s), of that (those) particular window(s) that are dedicated to the second, host, computer. A mapping of the positions and sizes and overlap of all windows is maintained. The windows, including the dedicated window(s), generally overlap each other either partially or totally. The information content within the display signal received from the second, host, computer is scaled and positioned so as to be entirely within the window(s) dedicated to that computer. The mapped dedicated display window(s) is (are) used to produce a switch control signal to the video switch upon each video raster scan. The switch control signal indicates that the video raster scan is either outside the dedicated window(s)— in which case the video switch will gate the video signal from the first computer to the monitor—or else is inside the dedicated window(s)—in which case the video switch will gate the video signal containing scaled and positioned information developed from the display signal output of the second computer to the monitor.

The added software program in the first, system-windowmanaging, computer performs communications functions including (i) opening and reserving a window dedicated to the second computer and (ii) communicating the dedications (assignments) and positions and sizes of all windows to the display controller.

Variations in the system of the present invention are possible. The first and the second computer can be the same computer. Alternatively, three or more computers can share windowed displays. The input peripherals, normally a keyboard and a locator tablet (mouse) can be located at various interfaces within the multi-computer system. The system-window-managing computer need not be the source of a display signal that is video, but the video display signal may alternatively be generated by the second, host, computer.

Accordingly, the present invention will be generally understood to be embodied in a system for the simultaneous display of windowed interleaved video information upon a single video monitor from a plurality of sources.

The system includes two or more computers at least one of which is managing a windowed display. The two or more computers collectively produce two asynchronous display signals at least one of which is video. A one of the computers managing the windowed display produces a data signal bearing information on the position and size of a window dedicated to the remaining one(s) of the computers.

A buffering/converting, synchronizing/positioning and scaling circuit receives the two asynchronous display signals and the data signal. The circuit buffers either or both of the two display signals (as required) and converts a remaining one display signal to video (as required) in order to produce two synchronized video display signals. The circuit positions and scales the informational content of that video display signal (that is derived from or converted from the second one of the two computer means, as the case may be) so that it is entirely positioned and sized within the dedicated window. Finally, the circuit produces a switch control signal indicating the portion of each of the two synchronized video display signals that is inside, and the portion that is outside, the dedicated window.

A video switch receives the synchronized video display signals and the switch control signal. It gates a one of the video display signals when it is outside the dedicated window and the other one of the video display signals when it is inside the dedicated window.

A display receives the gated video display signals and produces a video display.

Information from the one of the two computers managing the windowed display is displayed outside the dedicated window while information from the other one of the two computer means is displayed inside the dedicated window.

BRIEF DESCRIpTION OF THE DRAWINGS

These and other aspects and attributes of the present invention will become increasingly clear upon reference to the following drawings and accompanying specification wherein:

FIG. 9a is a first, "backbone" flow chart showing the locations where modifications/additions will be made to a first firmware routine executed by the display controller previously shown in FIGS. 2, 3 and 8;

FIG. 9b is a detailed flow chart of the modifications/additions to the first firmware routine for which the "background" flow chart is shown in FIG. 9a;

FIG. 10b is a second, detailed level flow chart of the modifications/additions to the second firmware routine for which the "backbone" flow chart is shown in FIG. 10a;

FIG. 12a is a first, "backbone" level flow chart of a firmware routine executed in performance of the frame start initialization block previously shown in FIG. 11;

FIG. 13a is a first, "backbone" level flow chart, showing the location whereat modifications/additions will be made to the polled events function previously conceptually shown in FIG. 11;

FIG. 15, consisting of FIGS. 15a through FIG. 5c, shows the format of control information communicated between the system-window-managing computer and the display controller, both of which were previously shown in FIG. 2.

DESCRIPTION OF THE PREFERRED EMBODIMENT

Figure 1:
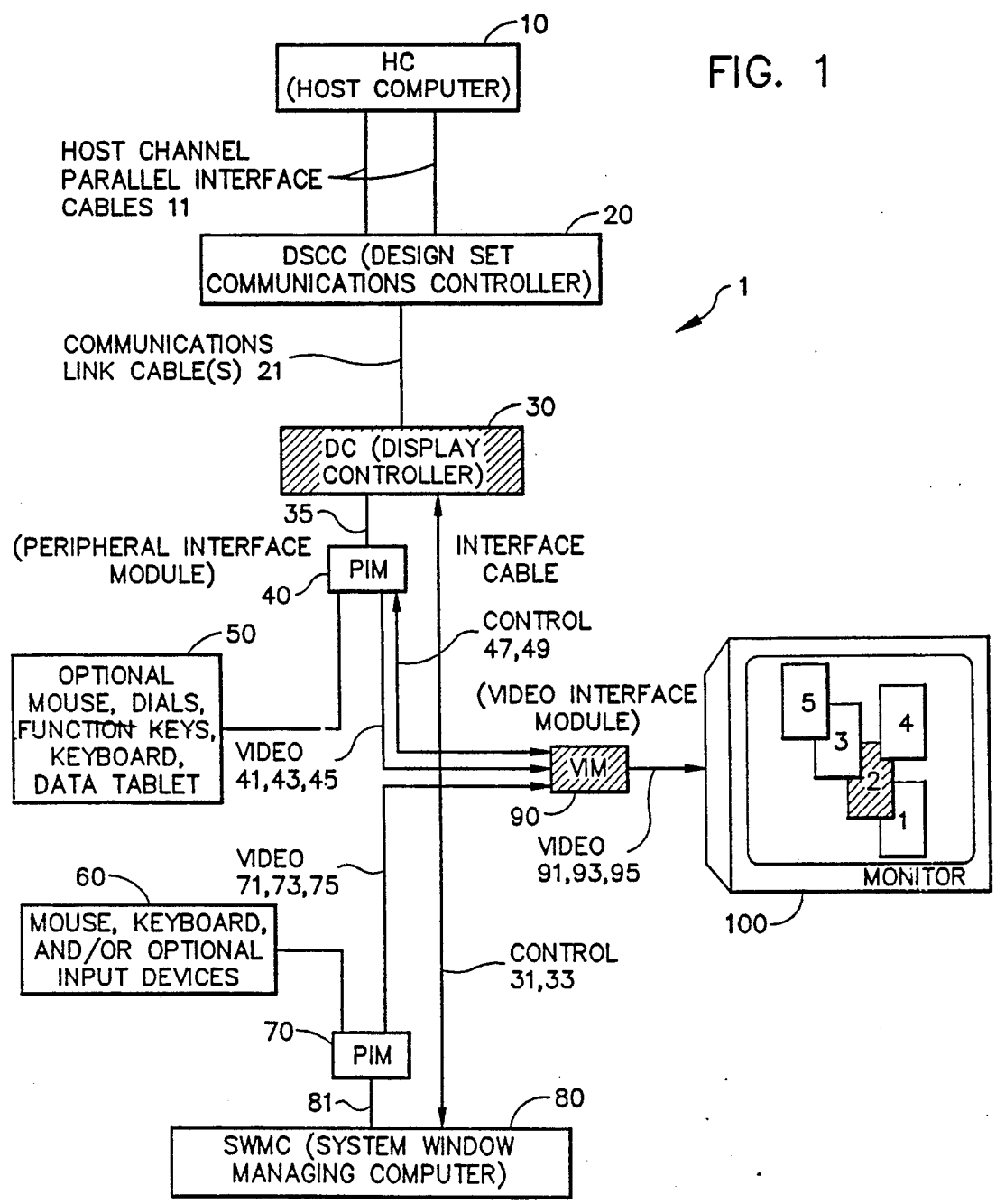
FIG. 1 is a first, top level block diagram of a digital computer graphics and communications system in accordance with the present invention for the simultaneous display of interleaved windowed video graphic information from multiple asynchronous computers on a single video monitor.
Figure 2:
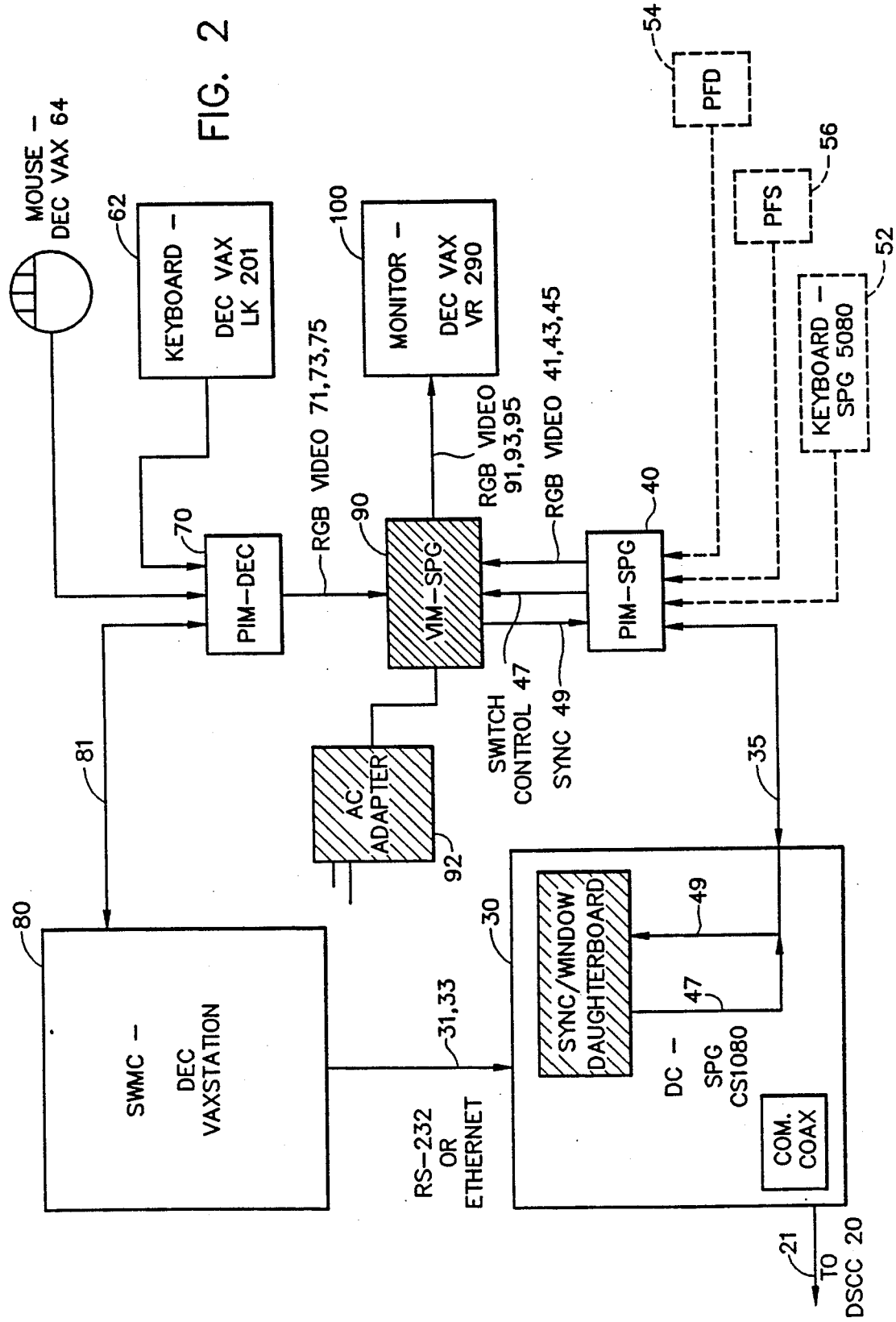
FIG. 2 is a first, top level block diagram of a specific preferred embodiment of the system of the present invention previously shown in FIG. 1.

A first, top level hardware block diagram of the digital graphics and communication system in accordance with the present invention is shown in FIG. 1. A block diagram of a specific, preferred, embodiment of the same system is shown in FIG. 2. The block diagram of FIG. 2, and subsequent figures, show a preferred embodiment of the present invention that is realized by additions, and by modifications, to two existing suites of hardware equipments. It will be recognized, consonant with the ensuing discussion, that the function of the present invention could equivalently be realized by diverse other computer, computer communications, and computer graphics equipments than those particular equipments that are within the preferred embodiment of the invention.

Referencing FIG. 1, one purpose of the digital communications and graphics system 1 in accordance with the present invention is to place a number of windowed displays 1-5 on a single video MONITOR console 100. One or more of these windows, for example cross-hatched window 2, is derived from a second, additional, HOST COMPUTER (HC) 10 instead of from the first, SYSTEM-WINDOW-MANAGING COMPUTER (SWMC) 80 which places the other windowed displays upon MONITOR console 100. The display of informational contents within (but not the mere existence of) cross-hatched window 2 on MONITOR console 100 can be considered to be a new function realized by system 1 of the present invention. This function is realized by certain existing equipments, and by such modified or new equipments as are indicated by cross-hatching in FIG. 1 and subsequent figures.

Among the previously existing equipments that are used in the system 1 is a SYSTEM-WINDOW-MANAGING COMPUTER (SWMC) 80. The SWMC 80 communicates through peripheral interface module PIM 70 to peripherals such as MOUSE, KEYBOARD AND/OR OPTIONAL INPUT DEVICES 60. The SWMC 80 also communicates through PIM 70 via VIDEO signals 71, 73, 75 to MONITOR console 100. The path of these VIDEO signals 71, 73, 75 is through video interface module VIM 90, which is a newly added device in the system 1 of the present invention.

In accordance with the invention, the SWMC 80 operates under programmed control to output certain information on one of its standard, preexisting, channel interfaces. This information is carried on CONTROL signals 31, 33. It is communicated to a DISPLAY CONTROLLER (DC) 30. The information carried as CONTROL signals 31, 33 includes the positions and sizes of all windows that appear on MONITOR console 100. The information also includes identification(s) of the particular one(s) of such window(s) (for example, window 2) that is (are) dedicated at SWMC 80 to the display of information arising at the second, HOST COMPUTER (HC) 10 (and other computers, if more than two are employed). Finally, the information may include keyboard codes and mapped tables.

An allocation under control of a program operating in SWMC 80 of a window (for example, window 2) that will appear on MONITOR console 100 and that will be filled by information arising at HC 10, and a communication under control of the same program of information regarding the positions and sizes and assignments of all windows, does not require any hardware modification to SWMC 80. The SWMC 80 operates a windowing software program such as is commonly available from several manufacturers. These windowing programs present a defined interface to user-programmable applications programs.

In accordance with the present invention, a particular applications program is programmed for, and operated by, the SWMC 80. This particular applications program performs the basic functions of 1) window control, 2) keyboard mapping, 3) mouse mapping, and 4) a "keep alive" function. The window control function permits the user, via interaction with MOUSE, KEYBOARD AND/OR OPTIONAL INPUT DEVICES 60, to create, size, and move the window(s) that are dedicated to the HC 10. The position, area, and existence, of this (these) window(s) is (are) communicated via CONTROL signals 31, 33 to the DC 30.

The applications program additionally opens by its interface to the windowing system software operating within the SWMC 80, an "x-window" having a desired position and size. This "x-window" effectively opens an unfilled window, or hole, in the windowed displays upon MONITOR console 100. The windowing system software operating within the SWMC 80 thinks that an application task has created a window, but is not producing any information to fill such window. Effectively, so far as the SWMC 80 is concerned, the window is blank, or black. The informational contents of such window will, in accordance with the present invention, be filled by information derived from HC 10.

The keyboard mapping and the mouse mapping functions that are performed by the applications program resident and operating within SWMC 80 permit the use of MOUSE, KEYBOARD AND/OR OPTIONAL INPUT DEVICES 60 for the production of codes and mapped tables. These codes and tables are transferred to HC 10 in lieu of the normal source of these codes and tables from the peripherals of OPTIONAL MOUSE, DIALS, FUNCTION KEYS, KEYBOARD, DATA TABLET 50. These mapped codes and tables are transmitted via CONTROL signals 31, 33 through DC 30 and DSCC 20 to HC 10.

The intent of this communication is simply to prevent the duplication of, and necessity that a human operator should move between, standard and equivalent sets of peripheral devices. It may be recognized that the HOST COMPUTER 10 and the peripheral devices attached thereto constitute a stand alone computer graphics workstation that would normally have a keyboard, mouse, and other input/output devices. The communication of mapped key codes and a mapped locator table from SWMC 80 via CONTROL signals 31, 33 to HC 10 permits that one keyboard, and mouse, suffice for use by both computers. The times when the codes and tables are actually so transferred will be when a human operator (not shown) has positioned a cursor (not shown) upon the screen of MONITOR console 100 to be within the area(s) of a window(s) dedicated to HC 10. The convenient use of one set of operator input/output peripheral devices, avoiding any necessity of physically changing between sets of such devices, for the communication with two computers obviously represents another aspect, and advantage, of the present invention.

Notably, the substitution of peripherals does not preclude that certain other peripherals and/or peripheral functions normally available to HC 10 should be obviated. For example, the dials function available at peripherals 50 is actually realized as a microcoded function enabled through DC 30. This function presents dials upon the MONITOR console 100. These dials may be adjusted to control, among other things, the rapidity of certain ongoing graphics manipulations such as rotation. When, as will be explained, the cursor control is within the window dedicated to the information from HC 10 then full peripheral functionality will be available to HC 10 and to the software operating therein from peripherals 50 as well as from peripherals 60. Normally, however, peripheral set 60 is employed exclusively.

The final, "keep alive" function performed by the application software program operating within the SWMC 80 is directed to permitting the DC 10 and SWMC 80 to know about each others existence, and to properly sequence the creation of the window(s) dedicated to HC 10 during various power conditions at both DC 30 and SWMC 80.

Continuing in FIG. 1, the host computer (HC) 10 acts through DESIGN SET COMMUNICATIONS CONTROLLER (DSCC) 20, DISPLAY CONTROLLER (DC) 30, PERIPHERAL INTERFACE MODULE (PIM) 40, and VIDEO INTERFACE MODULE (VIM) 90 to display of information on MONITOR console 100. The HC 10 communicates with the DSCC 20 across HOST CHANNEL PARALLEL INTERFACE CABLES 11. The DSCC is a multi-processor communications controller that attaches directly to this channel of HOST COMPUTER 10. This channel connection permits a high speed communication of HC 10 with graphics devices that are further connected to the DSCC. Communication with, and control of, such graphic devices, mainly MONITOR console 100, is effected by DC 30. The DSCC 20 communicates with DC 30 via COMMUNICATIONS LINK CABLE(S) 21. It should be noted that the communication occurring both across the HOST CHANNEL PARALLEL INTERFACE CABLES 11 and across the COMMUNICATIONS LINK CABLE(S) 21 is digital, and not video. The digital information communicated is buffered both within the DSCC 20 and again within the DC 30. This buffering decouples any further, video, display of the information from any timing requirement presented by HC 10 and by its parallel digital interface channel.

In accordance with the present invention, modifications/ additions are taken both to the hardware, and also to the firmware operating program, of DC 30. The hardware modification is in the form of an added printed circuit assembly (PCA) called a SYNC/WINDOW DAUGHTERBOARD (shown in FIGS. 2 and 4). This PCA contains about 20 equivalent Integrated Circuits (ICs) and attaches to the DC 30 via a newly added internal connector. The SYNC/WINDOW DAUGHTERBOARD performs the functions of 1) external synchronization, 2) internal synchronization, 3) power detection, and 4) window drive.

In performance of the external synchronization function, the added SYNC/WINDOW DAUGHTERBOARD receives a video sync signal 49 as a one of CONTROL signals 47, 49 from the VIM 90 via PIM 40. This video SYNC signal 49 is developed in VIM 90 from one (normally the green) of the RGB VIDEO signals 71, 73, 79 that are communicated to VIM 90 from SWMC 80 via PIM 70. To realize this external synchronization the SYNC/WINDOW DAUGHTERBOARD adjusts the phase of a video sync signal normally developed within DC 30 to the phase of the received SYNC signal 49 in a Phase Lock Loop (PLL) circuit. The internal video synchronization signal so developed is used to produce a pixel clock signal that controls the reading of graphics information from buffers within the DC 30. The internal synchronization signal also assures that the video output signals from DC 30 that are communicated to PIM 40 and then as VIDEO signals 41, 43, 45 to VIM 90 will be in synchronization with VIDEO signals 71, 73, 75.

The added SYNC/WINDOW DAUGHTERBOARD of the DC 30 performs its internal synchronization and power detection function by sensing the presence or absence of the video SYNC signal 49 that is developed from the VIDEO signals 71, 73, 75 of SWMC 80 as received at the PIM 90. When the SYNC signal 49 is not detected then the DC 30 uses an Emitter Coupled Logic (ECL) on-board oscillator versus a voltage controlled oscillator for its internal clock. It is assumed that the absence of the SYNC signal 49 represents that the SWMC 80 is not powered up, and a status signal so indicating is provided by the SYNC/WINDOW DAUGHTERBOARD to the operational firmware running within the DC 30.

A final function of the SYNC/WINDOW DAUGHTERBOARD added to DC 30 is window drive. Control of the VIM 90 is accomplished by storing an array of bits. Each bit represents an 8×8 pixel block on the screen of MONITOR console 100. This array is read out in synchronization with the (synchronized) video scan. A binary "1" in the array will force the VIM 90 to display information transmitted from the HC 10 via DC 30 while a binary "0" will allow the alternative video information communicated from SWMC 80 to be passed through the VIM 90.

Additional modifications/additions are taken to the DC 30 by changes to its firmware control programs. The DC 30 contains two microprocessors called a MP (Microprocessor) and a BP (Bit-slice Processor) (both shown in FIG. 3). The microcode executed by the BP is changed to accord the added functions of 1) primitive scaling, 2) cut-paste support, 3) sync/window board control, and 4) pop-up peripherals.

The BP's primitive scaling microcode scales all graphic orders including PICK, cursor locating and the like orders according to the dimensions of the window on MONITOR console 100 that will be dedicated to information received from HC 10. It may be recalled that the information on the position and size of this window is received at DC 30 via CONTROL signals 31, 33 from SWMC 80. The microcode recomputes new scaling tables upon each repositioning and/or resizing of the dedicated window.

The BP's added microcode supports interleaved style picture "grabbing" by reading a frame buffer (containing the informational contents that are within the areas of the windows) and storing this read data for subsequent use by the MP. This frame buffer information transfer accords for cut/paste support.

The modified firmware run by the BP further accords for control of the added SYNC/WINDOW DAUGHTERBOARD. The BP receives "rectangle lists" from the SWMC 80 via CONTROL signals 31, 33. These "rectangle lists" describe the location and geometry of the windows upon the screen of MONITOR console 100. The operating firmware converts the rectangle definition from its original specification in terms of origin (i.e., its starting position) and size into an array of bits. It is this array of bits which are eventually loaded into the array of bits within the SYNC/WINDOW DAUGHTERBOARD in order to control the window drive.

The firmware executed by the BP within the DC 30 is further modified to replace actual hardware peripherals with virtual pop-up peripherals. The virtual peripheral's are represented by suitable icons upon the MONITOR console 100. The virtual peripherals simulate actual hardware peripherals as required and requested. For example, one such virtual peripheral is dials. Its icon is a graphical representation of several dials which appears upon the display of MONITOR console 100. The setting on these several dials may be manipulated (by the keyboard, or mouse) as if an actual hardware peripheral offering variably adjustable dials were being invoked. The dial settings are thereafter communicated back to the program operating within HC 10, and are used to effect control of ongoing operations. For example, the rate of certain dynamic graphics manipulations such as image rotation may be controlled by adjustment of the dials.

In accordance with the present invention, modifications are also taken to the firmware program executed by the second, MP, microprocessor running within DC 30. The additions/modifications to the firmware executed by the MP include 1) communications to the SWMC 80, 2) peripheral substitution, 3) window commands, 4) cut/paste support, and 5) keep-alive code.

The changed firmware run by the MP manages the communications with the SWMC 80 via CONTROL signals 31, 33. The MP's changed firmware receives the data developed by MOUSE, KEYBOARD AND/OR OPTIONAL PERIPHERAL DEVICES 60 that is transferred from SWMC 80 via CONTROL signals 31, 33. This data is especially necessary whenever the operator-controlled cursor upon the face of MONITOR console 100 is located within the windowed area (by example, window area 2) that is dedicated to information arising at HC 10. During this operation the MP of DC 30 must track the virtual position of the cursor because the position of such cursor is otherwise unknown by any direct input from a mouse or keyboard to DC 30 and then to HC 10.

The modified firmware run by the MP of DC 30 also supports commands arising from the application software module running within the SWMC to activate, and to size, the window upon MONITOR console 100 that is devoted to the information from HC 10.

The modified firmware run by the MP of DC 30 is responsive to appropriate commands, somewhat like hard copy code, that are sent to the MP from the BP. These commands provide that the MP will send BP-provided information in the direction from DC 30 to SWMC 80 via CONTROL signals 31, 33 for the purpose of being transferred into other windows (e.g., windows 1, 3–5 on MONITOR console 100) that are maintained by software operating within SWMC 80.

Finally, the firmware run by the MP determines via regular inquiry of the SYNC/WINDOW DAUGHTERBOARD as to whether or not the SWMC is powered up in order to accord for proper modifications of the window characteristics.

In accordance with the present invention, a unique hardware element within system 1 is the VIDEO INTERFACE MODULE (VIM) 90. This item typically resides at or near the rear of SWMC 80, and is approximately the size of a cigarette pack. It is connected to the PERIPHERAL INTERFACE MODULE (PIM) 70 of the SWMC 80 by existing cabling. The VIM 90 incorporates a very high speed video switch that is built with analog Field Effect Transistor (FET) switches, operational amplifiers (0P AMPs) and discrete components. The VIM 90 performs DC restoration in order to interface two AC-coupled video signals respectively received from DC 30 and SWMC 80 without variation in the relative "shade" of the respective images developed on MONITOR console 100. The DC restoration also maintains fidelity of color.

The VIM 90 also derives the SYNC signal 49 that is supplied as a CONTROL signal 47, 49 to DC 30 via PIM 40. This SYNC signal 49 is stripped from the green (G) one of the Red Green Blue (RGB) VIDEO signals 71, 73, 75. The VIM 90 typically derives its power from a "wall module" similar to those used to charge a pocket calculator.

A preferred embodiment of part of the computer graphics and communication system 1 in accordance with the present invention is shown in block diagram in FIG. 2. The SYSTEM-WINDOW-MANAGING COMPUTER (SWMC) 80 is preferably implemented as a VAXstation from Digital Equipment Corporation (DEC). The HOST COMPUTER (HC) 10 (not shown in FIG. 2) is typically a System 360 or System 370 mainframe computer available from IBM Corporation. This HC 10 communicates with a DESIGN SET COMMUNICATIONS CONTROLLER (DSCC) 20 (not shown in FIG. 2) and then via a coaxial cable to the DISPLAY CONTROLLER (DC) 30. The DC 30 is implemented as a modification of the controller present within the DS 1082GXP high performance graphics system available from Spectragraphics Corporation (SPG). In its modified form the DS 1082GXP Controller is identified as the SPG CS 1080 Display Controller. The SWMC 80 bidirectionally communicates with the DC 30 via signals 31, 33 which are carried (typically) on an interface of the RS-232 type. The signals 31, 33 may alternatively be communicated on an Ethernet channel.

The SWMC 80 bidirectionally communicates via signals 81 to PERIPHERAL INTERFACE MODULE (PIM) 70. Signals Red Green Blue (RGB) VIDEO 71, 73, 75 are further communicated to VIDEO INTERFACE MODULE (VIM) 90. Peripheral input signals arising at the MOUSE 64 and the KEYBOARD 62—both of which peripherals are typically associated with the DEC VAXstation— are received at PIM 70 and communicated as signals 81 to SWMC 80.

Meanwhile, the DC 30 bidirectionally communicates via SIGNALS 35 to PERIPHERAL INTERFACE MODULE (PIM) 40. Both PIM 70 and PIM 40 are normally types respectively available form Digital Equipment Corporation (DEC) and Spectragraphics Corporation (SPG). Both PIM's are interface boxes that essentially permit the amalgamation of cabling in order to save room and clutter. Red Green Blue (RGB) VIDEO signals 41, 43, 45 are further communicated from PIM 40 to VIM 90. Two control signals 47, 49 are additionally communicated between PIM 40 and VIM 90. A SWITCH CONTROL signal 47 originates at PIM 40 and is received at VIM 90. A SYNC signal 49 originates at VIM 90 and is received at PIM 40. This SYNC signal 49 is further communicated via signals 35 to be received at the SYNC/WINDOW DAUGHTERBOARD 370 of DC 30.

The RGB VIDEO signals 71, 73, 75 and the RGB VIDEO signals 41, 43, 45 are selected under control of SWITCH CONTROL signal 47 in VIM 90 to produce RGB VIDEO signals 91, 93, 95. The RGB video signals 91, 93, 95 are received at MONITOR console 100, which is normally of the type VR290 available within the VAXstation product from DEC. The VIM 90 is powered to perform its video switching function by AC adaptor 92.

Optional peripherals that may be connected through PIM 40 to DISPLAY CONTROLLER 30 are shown in dashed line within FIG. 2. Programmable function dials (PFD) 54, programmable function switches (PFS) 56, and a keyboard 52 (typically of the 5080 type) are all available from Spectragraphics Corporation. If these peripherals and/or virtual periphals (or enabled) are connected then they communicate through DISPLAY CONTROLLER 30 to DSCC 20 and then to HC 10 (both shown in FIG. 1) for the purpose of providing operator control inputs to the software program operating within HC 10.

In accordance with the present invention, the keyboard and locator tablet functions are respectively provided by KEYBOARD 62 and MOUSE 64 communicating through PIM 70 to SWMC 80. The codes, and tables, resultant from manual actuation of these peripheral devices are communicated via signals 31, 33 to DC 30, and then to DSCC 20 and HC 10 (both shown in FIG. 1). In this manner the single set of peripherals comprising MOUSE 64 and KEYBOARD 62 suffices for operator inputs to both SWMC 80 and to HC 10 (shown in FIG. 1). It would, alternatively, be possible that the alternative set of peripherals 52, 54, 56 should suffice for communication to both computers 10, 80. In such a case the firmware program resident within DC 30 would provide for the transmission of appropriate codes from DC 30 to SWMC 80 via signals 31, 33. As it is, the application software routine running within SWMC 80 provides for information transmission in the reverse direction.

Figure 3:
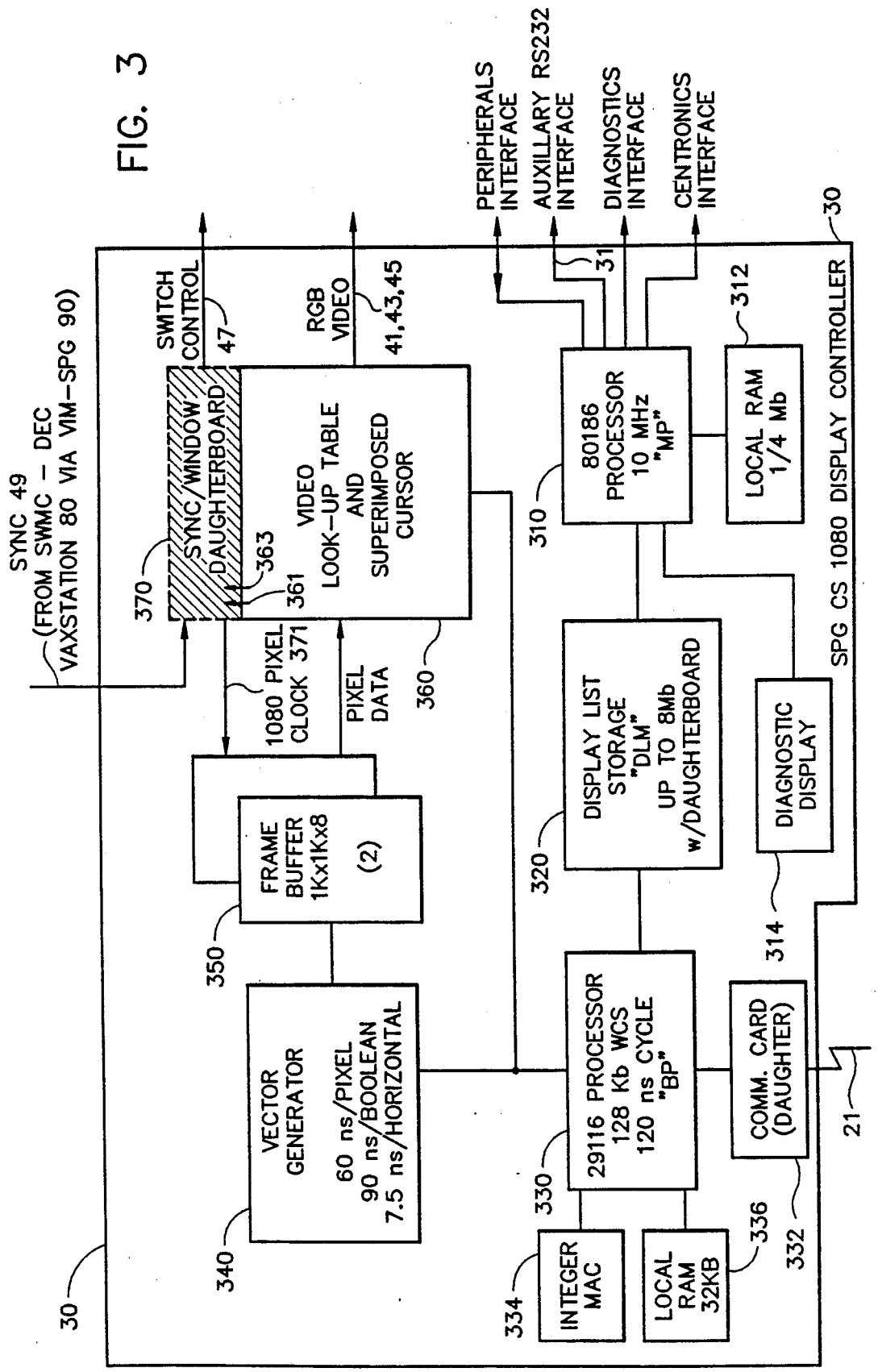
FIG. 3 is a second, intermediate level block diagram showing a specific implementation of the display controller component of the specific preferred embodiment of the system of the present invention previously shown in FIG. 2.

A block diagram of the display controller of the DC 1082GXP graphics system product of Spectragraphics Corporation modified so as to become the FPG CS1080 Display Controller 30 that is used within the system 1 of the present invention is shown in block diagram in FIG. 3. As may be immediately noticed by the cross-hatched shading, the hardware modifications/additions to DC 30 are in the area of SYNC/WINDOW DAUGHTERBOARD 370. The firmware which is executed both by the BP microprocessor 330 and the MP microprocessor 310 is also altered. Such altered firmware maintains new and different files in the DISPLAY LIST STORAGE 320.

When employed with a monitor such as the MONITOR console 100 of system 1, the CS1080 DISPLAY CONTROLLER 30, and its parent DS 1082GXP controller, each allow a VAXstation to emulate IBM 5080 terminals in an IBM host network. In a host network, terminals serve the role of operator input and communications devices for a mainframe computer. From a terminal the operator requests and directs processing functions that may be performed on the host computer. The results of the processing are communicated back to the terminal. Like the 5080 terminals which it emulates, host channel addresses are permanently assigned to specific VAXstations during installation of the CS 1080 DISPLAY CONTROLLER 30. Channel addresses are assigned at installation by settings on the DSCC 20 (shown in FIG. 1). Each communications processor card in the DSCC 20 can support up to eight (8)- CS 1080 systems, and up to sixty-four (64) total addresses are available in the DSCC. A communication transpiring to a one SPG CS 1080 DISPLAY CONTROLLER 30 such as is shown in FIG. 3 is via signals 21 received at COMM. CARD (DAUGHTER) 332. The information in the communication is received into, or transmitted form, BP 330. The BP 330 is of the 29116 type with a 128 Kb WCS and a 120 ns cycle time. The BP 330 is supported in its operations by a LOCAL RAM 336 of 32 Kb, and by an INTEGER MAC 334.

A second microprocessor within the SPG CS 1080 DISPLAY CONTROLLER 30 is the MP 310. This MP 310 is an 80186 type with a 10 Mhz clock. It manages the PERIPHERALS INTERFACE, AUXILLARY RS232C INTERFACE, DIAGNOSTIC INTERFACE 31, and CENTRONICS INTERFACE that connect to devices other than the DSCC 20 (shown in FIG. 2) with which the DISPLAY CONTROLLER 30 communicates. The operating firmware for MP 310 is contained in LOCAL RAM 312, typically of $\frac{1}{4}$ megabyte size. The MP microprocessor 310 produces a display resultant from diagnostic testing and/or the status of DISPLAY CONTROLLER 30 in DIAGNOSTIC DISPLAY 314.

The BP 330 and the MP 310 communicate via "mailbox" messages written to the DISPLAY LIST STORAGE (DLM) 320. The BP 330 and MP 310 cooperatively operate to form information within the DLM 320. The size of the DLM 320 may be up to 8 Mb with attached daughterboards.

The AUXILLARY RS232C INTERFACE 31 to MP 310 receives the position, location, and assigned computer definitions of all windows that are managed by SWMC 80. The format of information interchanged across this interface will be further discussed in conjunction with FIG. 15. The BP microprocessor 330 operates to scale, and to position, the information received from DSCC 20 and HC 10 (shown in FIG. 2) via signals 21 in order to place this information within DLM 320 at an appropriate scale, and position, as reflects its location within the dedicated window(s). The totality of such windows are identified to MP microprocessor 310 via AUXILLARY RS232C INTERFACE 31. This is simply to say that the information within DLM 320 will be organized similarly as it ultimately appears in the dedicated window(s) on the video monitor, for example in the dedicated window 2 on MONITOR console 100 shown in FIG. 1.

It should be understood that BP 330 performs a fairly sophisticated function under firmware control. If the dedicated window 2 is inspected upon the face of MONITOR console 100 shown in FIG. 1, it may be observed that it may be overlapped by certain other windows, and may itself overlap still further windows. All windows are managed within system-window-managing computer (SWMC) 80. The BP microprocessor 330 runs the firmware program that determines the shape, position, scale, and informational contents of the dedicated window when it is displayed among other windows upon the MONITOR console 100 (shown in FIG. 1). This determination is essentially made by organizing an image area of the dedicated window within the DLM 320.

At such times as it is desired to display the which was carried on SIGNALS 21 from HC 10 via DSCC 20 (shown in FIG. 2), BP 330 passes frame information to a VECTOR GENERATOR 340. The VECTOR GENERATOR 340 is a high speed graphics generator generating a pixel each 60 nanoseconds, making a boolean determination each 90 nanoseconds, and operating with a clock, or minimum horizontal raster scan sweep increment, of 7.5 nanoseconds. The generated frame is stored in one of the interleaved FRAME BUFFERS 350. Two such interleaved FRAME BUFFERS 350, each 1 K by 1 K by 8 bits in size, permit that one buffer may be loaded while the other buffer is being read. The PIXEL DATA is read to VIDEO LOOK-UP TABLE & SUPERIMPOSED CURSOR circuit 360. It is therein used to control the black/white condition of an RGB VIDEO output signals 41, 43, 45.

In accordance with the present invention, the VIDEO LOOK-UP TABLE & SUPERIMPOSED CURSOR circuit 360 interfaces to a newly added SYNC/WINDOW DAUGHTERBOARD 370 via signals 361, 363. This SYNC/WINDOW DAUGHTERBOARD 370 receives the SYNC signal 49 from the SWMC 10. From this signal it produces a 1080 PIXEL CLOCK signal 371 which is routed to FRAME BUFFER 350, and also the SWITCH CONTROL signal 47 which is routed to VIM 90 (shown in FIGS. 1 and 2). The 1080 PIXEL CLOCK signal 371 essentially controls the timing, and rate, with which data is read from FRAME BUFFER 350 to the VIDEO LOOK-UP TABLE & SUPERIMPOSED CURSOR circuit 360. The SWITCH CONTROL signal 47 will control the switching of video signals between RGB VIDEO signals 41, 43, 45 and VIDEO signals 71, 73, 75 in VIM 90.

Figure 4:
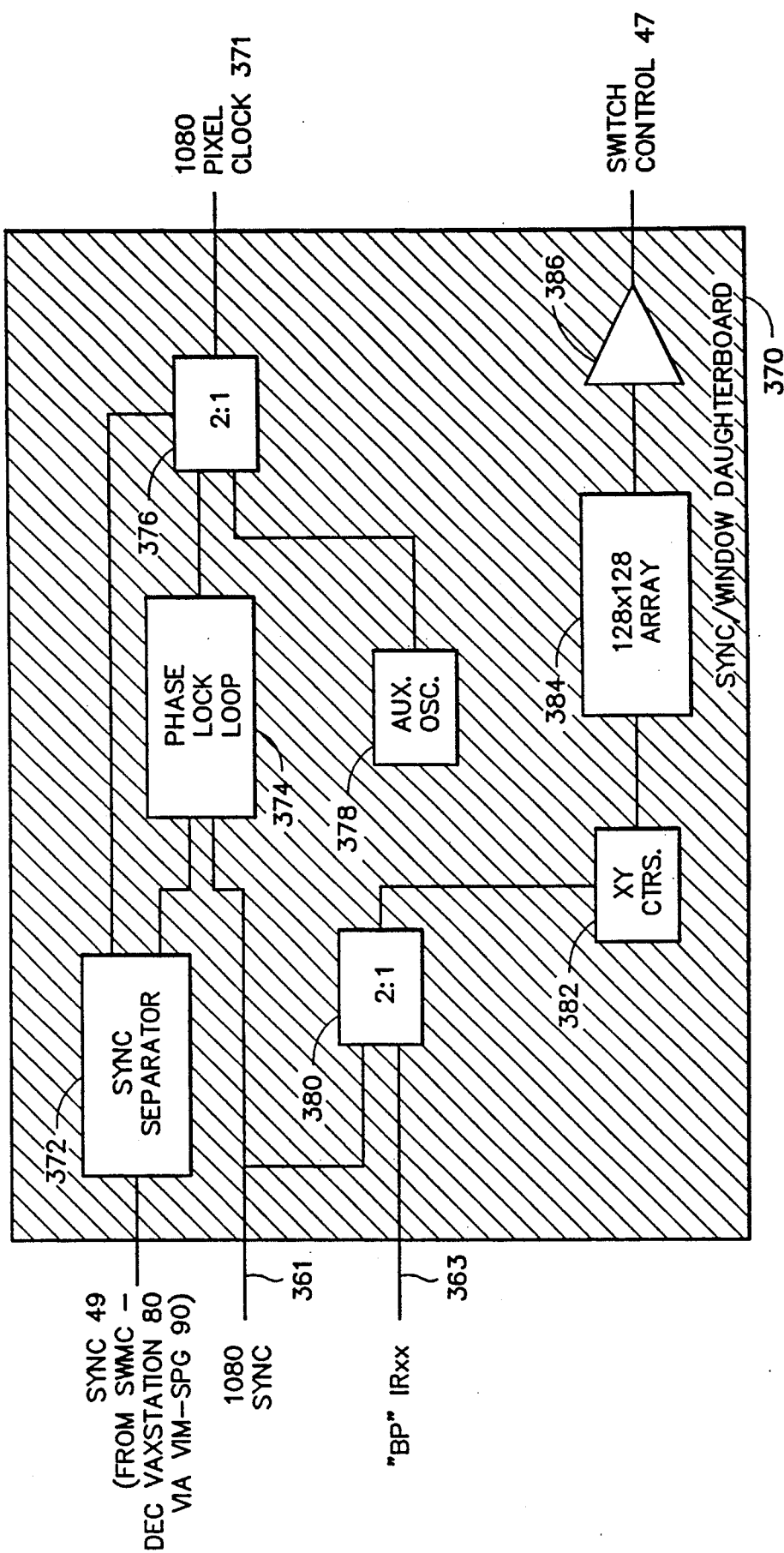
FIG. 4 is a third, bottom level block diagram showing the sync/window daughterboard part of the display controller previously shown in FIGS. 2 and 3.

A next lower, second level block diagram of the SYNC/ WINDOW DAUGHTERBOARD 370, previously seen in FIG. 3, is shown in FIG. 4. An SYNC SEPARATOR circuit 372 receives the SYNC signal 49 indirectly from SWMC 10 via VIM 90 (both shown in FIGS. 1 and 2). This video synchronization signal is locked to the 1080 SYNC signal 361 in PHASE LOCK LOOP circuit 374. The 1080 SYNC signal 361 is the signal conventionally developed in SPG CS 1080 display controller 30 (shown in FIG. 3) for reading out the data from FRAME BUFFER 350 to the VIDEO LOOKUP TABLE & SUPERIMPOSED CURSOR circuit 360. In accordance with the present invention, this readout, or synchronization signal, is locked to SYNC signal 49 by operation of PHASE LOCK LOOP circuit 374. The signal output from PHASE LOCK LOOP circuit 374 is passed through multiplexer 2:1 376 to be routed to FRAME BUFFER 350 (shown in FIG. 3) as 1080 PIXEL CLOCK signal 371. At such times as the SWMC 10 is determined, by lack of SYNC signal 49, not to be operative, or to be powered off, then the signal output from auxillary oscillator AUX. OSC. 378 is alternatively routed through duplexer 2:1 376 to serve as 1080 PIXEL CLOCK signal 371 used for interrogating the FRAME BUFFER 350 (shown in FIG. 3).

Continuing in FIG. 4, the "BP" IRxx signal 363 is an index signal used to LOAD the contents of the 128×128 array 384. Routed via multiplexer 2:1 380, these signals 363 control operation of XY CTRS. 382.

In normal operation, the XY CTRS. 382 are controlled by the 1080 SYNC signal 361 so as to be synchronized with the video SYNC signal 49 derived from SWMC 80.

The XY CTRS. 382 as counted by the indexing signal interrogate a 128x128 array 384 to produce, when amplified in amplifier 386, the SWITCH CONTROL signal 47. This SWITCH CONTROL signal 47 is routed to VIM 90 (shown in FIGS. 1 and 2). It exhibits a logical high, or true condition, when the VIDEO signals 71, 73, 75 arising from SWMC 80 are to be routed through VIM 90, and a logical low, or false condition, when the VIDEO signals 41, 43, 45 are alternatively to be routed through VIM 90. The SWITCH CONTROL signal 47 thus controls the selection of the VIDEO signals 91, 93, 95 that produce a composite display upon video MONITOR console 100 (shown in FIGS. 1 and 2).

The SYNC/WINDOW DAUGHTERBOARD 370 is thus operative to control the generation of a display from HC 10 upon video MONITOR console 100 even during such times as the SWMC 80 is not in use. During such times the system 1 in accordance with the present invention is not in use for the simultaneous display of interleaved windowed graphics video information from two computers upon a single video monitor then HC 10 can still use MONITOR console 100 through DSCC 20 and DC 30 (all shown in FIG. 1).

Figure 5:
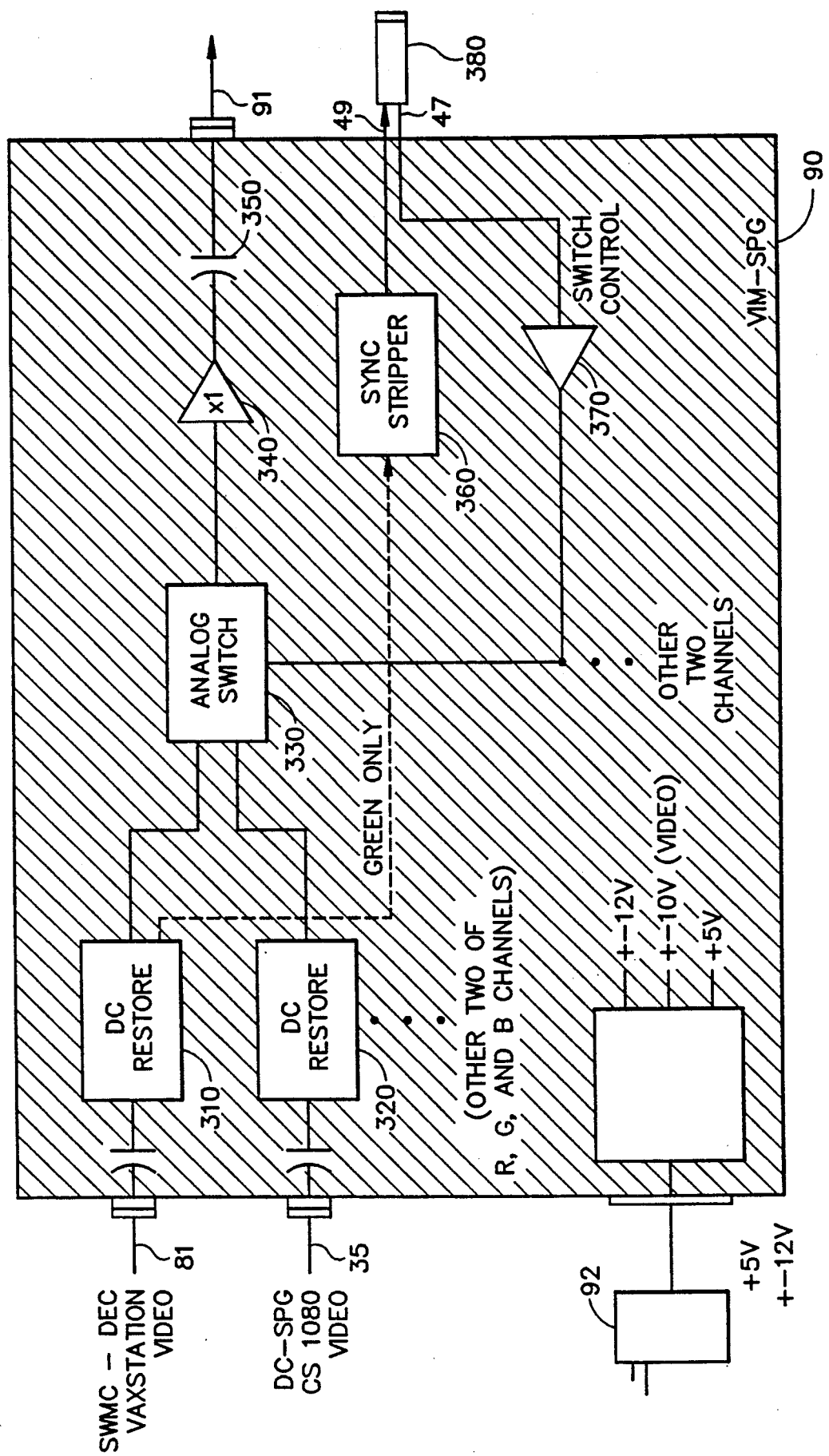
FIG. 5 is a third, bottom level block diagram showing the video interface module previously shown in FIG. 2.

An intermediate, second, level block diagram of the VIM 90, previously seen in FIG. 1 and FIG. 2, is shown in FIG. 5. The VIM 90 is suggested to be available from Spectragraphics Corporation (SPG), assignee of the present invention. The VIM 90 is essentially a high speed digital switch and is readily constructable by practitioners of the video display arts.

A complementary red or green or blue pair of the VIDEO signals 41, 43, 45 and 71, 73, 75—for example VIDEO signal 71 arising from SWMC 10 that is typically a DEC VAXstation, and VIDEO signal 35 from DC 30 that is typically of type SPG CS 1080—are received through DC isolation capacitors into respective DC RESTORE circuits 310, 320. Other respective pairs of the red, green, and blue VIDEO signals are likewise respectively received at similar DC RESTORE circuits (not shown). The SWITCH CONTROL signal 47 is received via plug jack 380 and buffered in buffer 370 for control of ANALOG SWITCH 330. A selected one of the video signals from the SWMC 10 or from the DC 30 is gated through ANALOG SWITCH 330 under control of the SWITCH CONTROL signal 47, amplified in x1 amplifier 340, DC isolated by capacitor 350, and outputted as a one of the VIDEO signals 91, 93, 95—for example as signal 91. In a like manner the remaining R, G, or B video signals are themselves switched in additional ANALOG SWITCHes (not shown), and outputted as remaining ones of the VIDEO signals 91, 93, 95 to video MONITOR console 100 (shown in FIG. 1).

The VIM 90 performs the additional function of stripping the video synchronization from a the green one of VIDEO signals 71, 73, 75 in an SYNC STRIPPER circuit 360. The SYNC signal 49 so produced is routed through plug jack 380 and then to DC 30, where it is used as shown in FIG. 4.

The VIM 90 has an external AC adaptor 92 which provides power of ±12 vdc and ±5 vdc for the internal circuits of VIM 90. The further voltage of ±10 vdc is generated internally within the VIM 90 from the ±12 vdc input for use by the video circuitry.

Figure 6A:
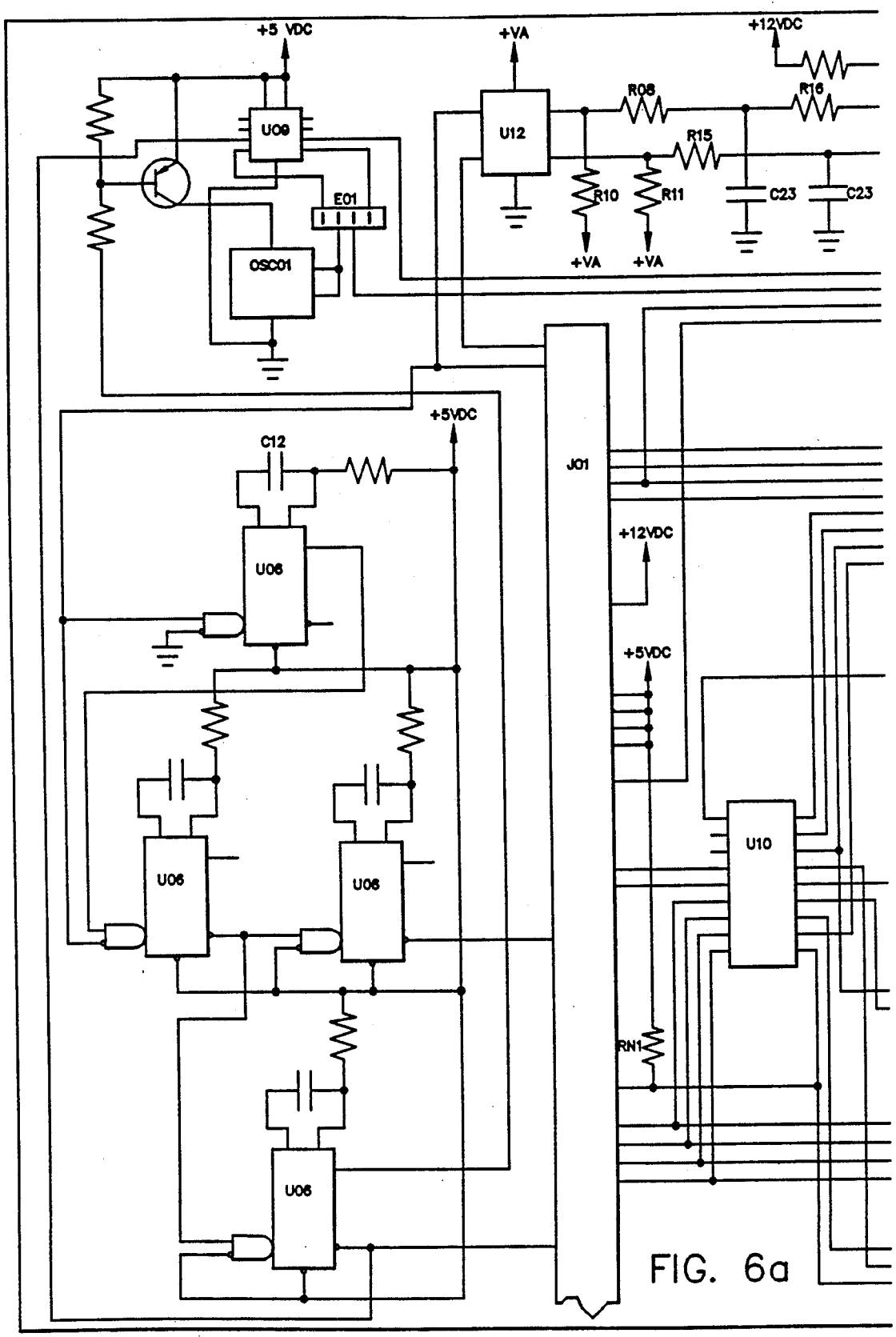
FIG. 6, consisting of FIG. 6a through FIG. 6c, is a detailed electrical schematic diagram of the sync/window daughterboard previously shown in block diagram in FIG. 4.
Figure 6B:
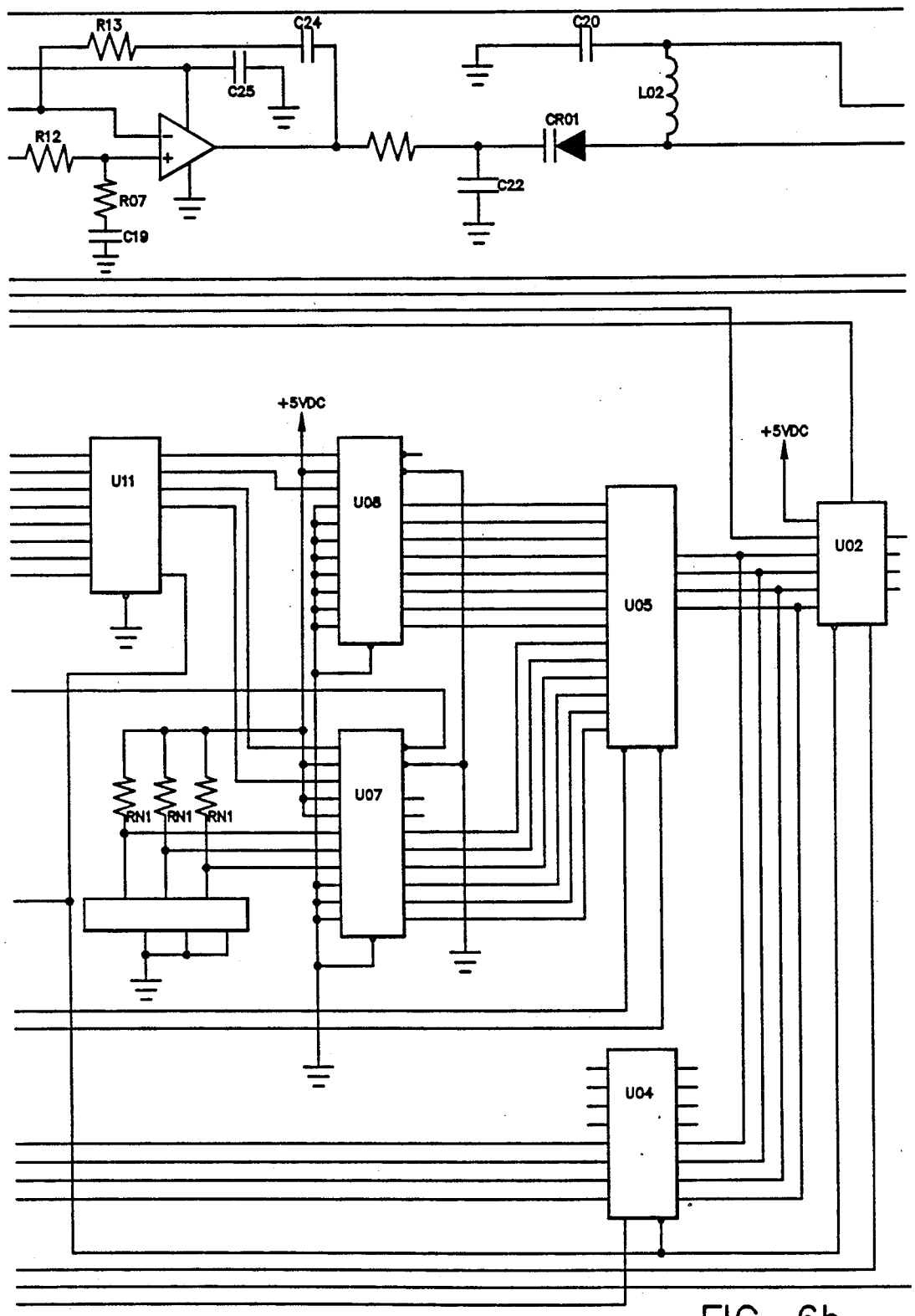
Figure 6C:
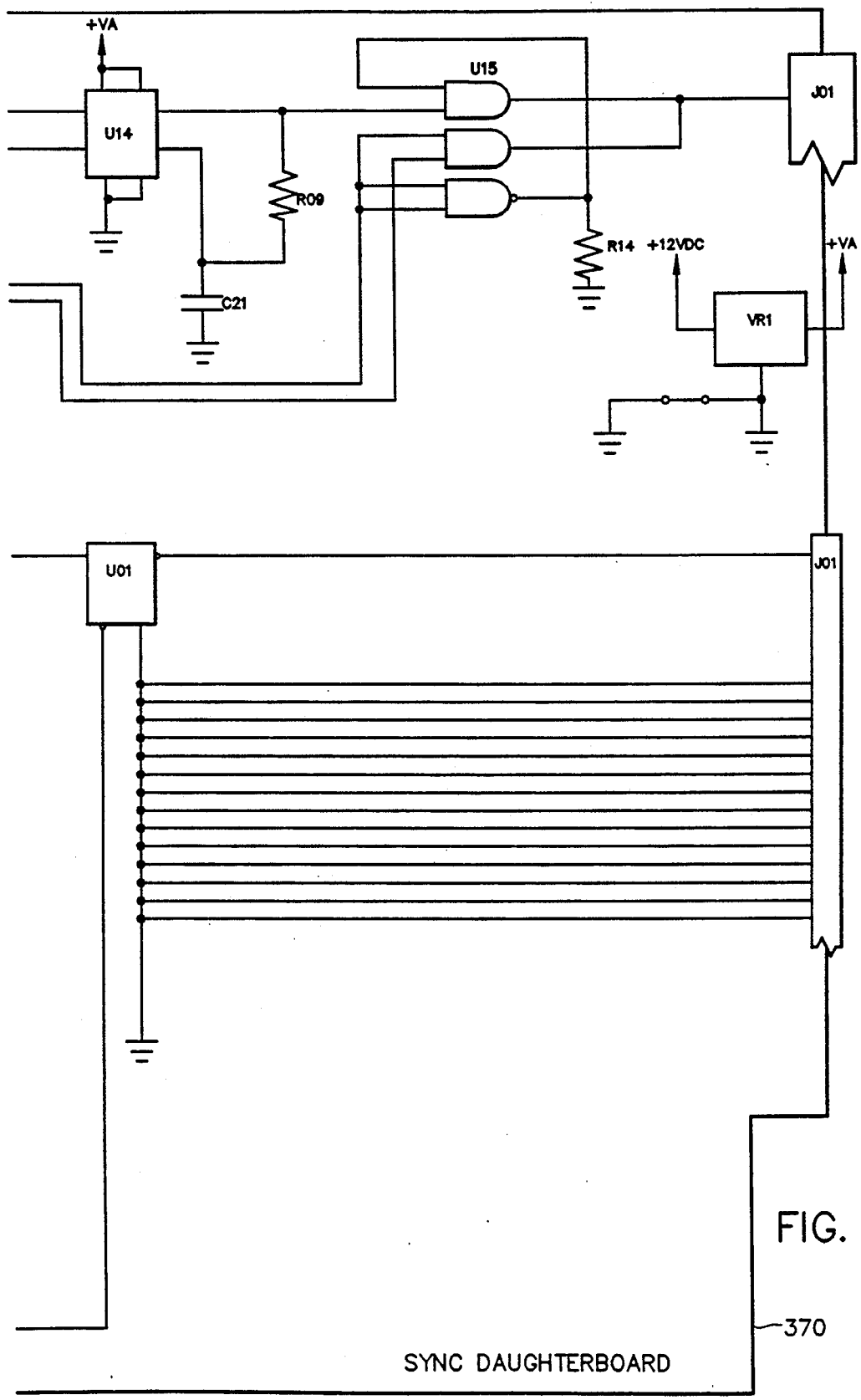

A detailed schematic diagram of a preferred embodiment of the SYNC/WINDOW DAUGHTERBOARD 370 previously shown in block diagram in FIG. 4 is shown in FIG. 6. The parts list for this preferred embodiment is as follows:

| Schematic Reference | Description |
| --- | --- |
| 12U3,U6 | IC, 74LS123 |

-continued

| Schematic Reference | Description |
| --- | --- |
| U4 | IC, 74LS245 |
| U7,U8 | IC, 74LS461, OCTAL COUNTER |
| U11 | IC, 74S157 |
| U2 | IC, 74F194 |
| U1 | IC, 26LS31 NO NATIONAL |
| U15 | IC, 10104 |
| U12 | IC, 11C44/MC4044, PHASE COMPARAT |
| U14 | IC, 1648, VOLTAGE CONTROLLED OSC |
| U5 | IC, SRAM, 16K × 4, 45 NS, 22 DIP, .3 |
| CR1 | DIODE, MV2106, VARACTOR |
| Q1 | TRANSISTOR, 2N3906 |
| VR1 | REGULATOR, 78L05CZ, 5 V 100 MA |
| OSC1 | OSC, TTL, 69.1968 MHZ |
| U13 | IC, OP AMP, LM741 |
| R5,R17 | RES, 100 OHM, ¼ W 5% |
| R6 | RES, 1K OHM, ¼ W, 5% |
| R4 | RES, 10K OHM, ¼ W 5% |
| R3 | RES, 100K OHM, ¼ W 5% |
| R8,R12,R15,R16 | RES, 2.2K OHM, ¼ W 5% |
| R18 | RES, 330 OHM, ¼ W 5% |
| R1 | RES, 33K OHM, ¼ W 5% |
| R7, R13 | RES, 470 OHM, ¼ W 5% |
| R9,R10,R11,R14 | RES, 510 OHM, ¼ W 5% |
| RN1 | RES NTWK, SIP, 1K × 9, 10 PIN |
| U9 | RES NTWK, DIP, TTL TO ECL, 16 PI |
| C1,C4,C5,C15 | CAP, TANT, 6.8 UF, 35 V, 10%, AXI |
| C16,C17 | CAP, TANT, 6.8 UF, 25 V, 10%, RAD |
| C22 | CAP, CER, 100 PF, 50 V, 10% |
| C21 | CAP, CER, .01 UF, 50 V, 20% |
| C2,C3,C7,C8,C10, C11,C13,C14,C18, C20,C23,C25,C26, C27,C28,C29 | CAP, CER, .1 UF, 50 V, 20% |
| C19,C24 | CAP, CER, 1 UF, 50 V, 20% |
| C6,C9,C12 | CAP, CER, .001 UF, 2K V, 20% |
| L2 | INDUCTOR, .15 UH |
| U10 SOCKET | SOCKET, 20 PIN, (.3), .130 L |
| E1,E2 | HEADER, 6 PIN, .025 PIN, .06 PCB |
| R2 | RES, 56K OHM, ¼ W 5% |
| E1,E2 | JUMPER BLOCK, FOR .1 SPACED HEAD |
| U10 | IC, PAL 16L8A |

Figure 7A:
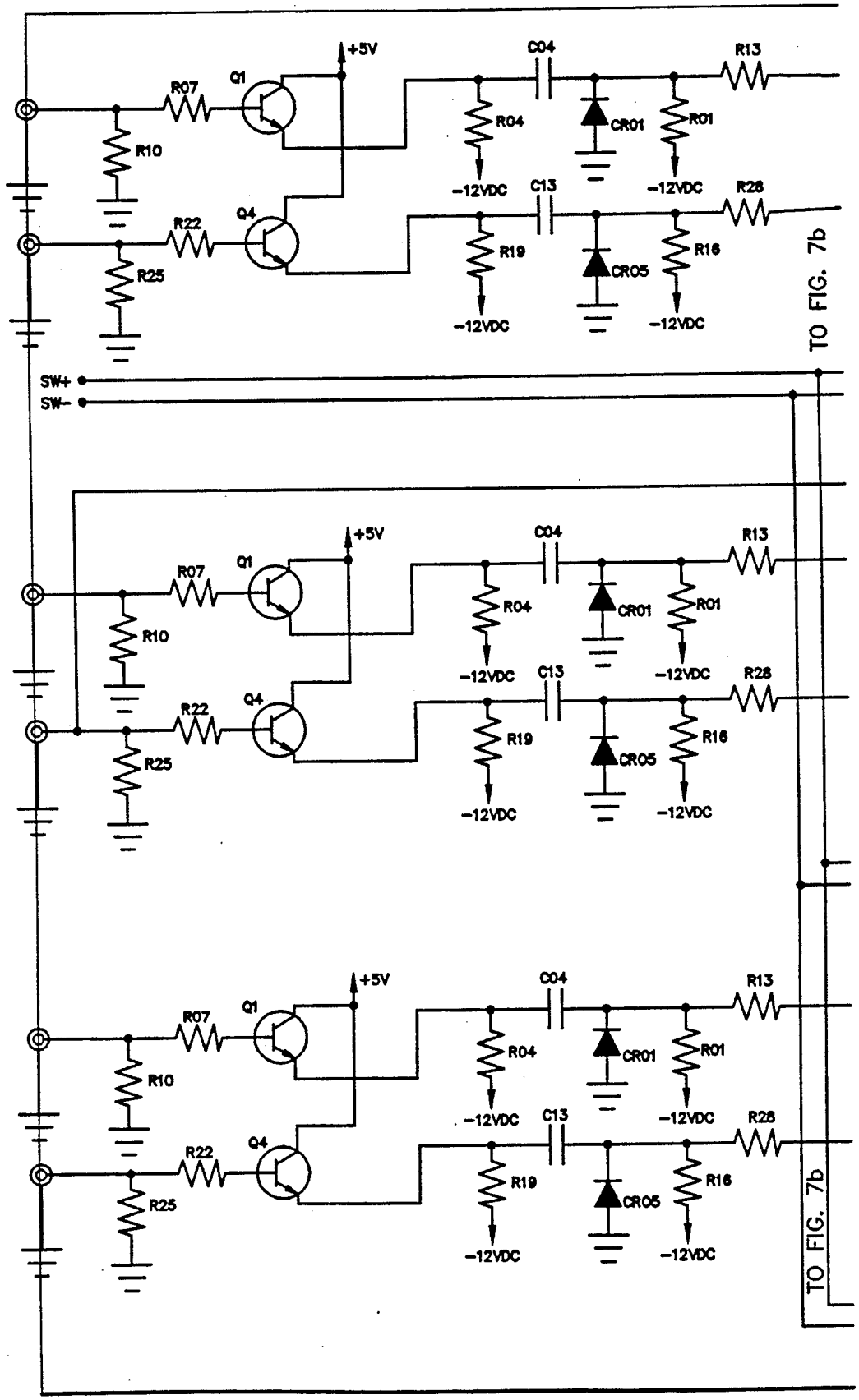
FIG. 7 consisting of FIG. 7a through FIG. 7c, is a detailed electrical schematic diagram of the video interface module previously shown in block diagram in FIG. 5.
Figure 7C:
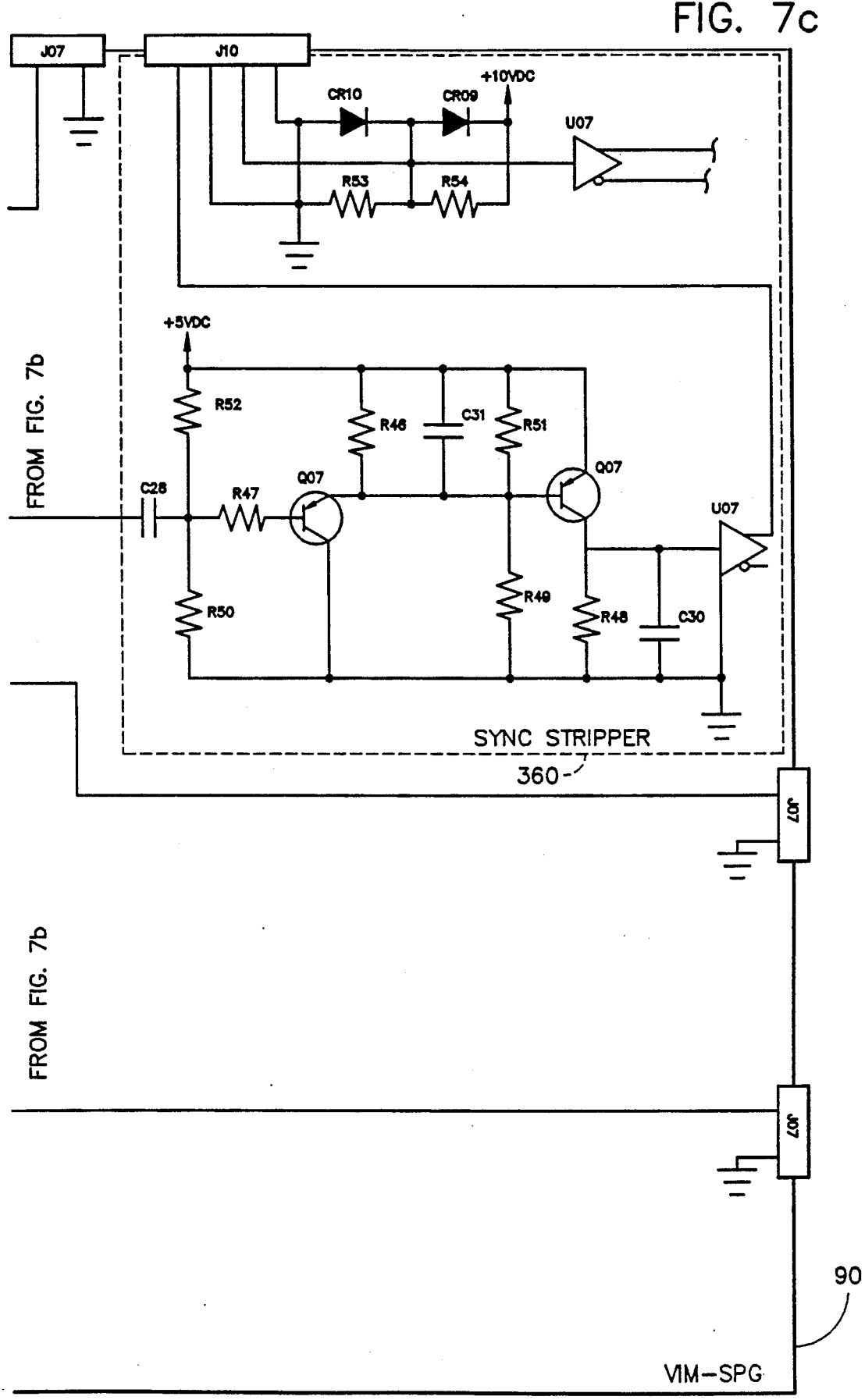

A detailed schematic diagram of a preferred embodiment of the VIM 90 previously shown in block diagram in FIG. 5 is shown in FIG. 7. The parts list for this preferred embodiment is as follows:

| Schematic Reference | Description |
| --- | --- |
| U7 | IC, 26LS31 |
| U1,U2,U3 | IC, ANALOG SWITCH, SD5001 |
| CR1,CR2,CR3, CR4,CR5,CR6, CR9,CR10 | DIODE, 1N914 |
| Q1,Q2,Q3,Q4,Q5, Q6 | TRANSISTOR, 2N3904 |
| Q7,Q8 | TRANSISTOR, 2N3906 |
| CR7,CR8 | DIODE, 1N758, ZENER, 10 V, 10% |
| U4,U5,U6 | IC, OP AMP, NE5539 |
| R7,R8,R9,R22, R23,R24 | RES, 100 OHM, ¼ W 5% |
| R13,R14,R15,R28, R29,R30,R4,R5, R6,R19 R20,R21 | RES, 1K OHM, ¼ W, 5% |
| R49 | RES, 100K OHM, ¼ W 5% |
| R1,R3,R16,R18 R57,R58,R59 | RES, 15K OHM, ¼ W 5% |
| R31,R33,R35,R41, R42,R45 | RES, 200 OHM, ¼ W 5% |
| R53,R54 | RES, 220 OHM, ¼ W 5% |
| R46 | RES, 2.2K OHM, ¼ W 5% |
| R51 | RES, 22K OHM, ¼ W 5% |
| R2,R17 | RES, 27K OHM, ¼ W, 5% |
| R37,R39,R43,R50 | RES, 3K OHM, ¼ W 5% |
| R38,R40,R44,R48 | RES, 4.7K OHM, ¼ W 5% |

-continued

| Schematic Reference | Description |
| --- | --- |
| R47,R52 | RES, 6.8K OHM, ¼ W 5% |
| R10,R11,R12,R25, R26,R27,R32,R34, R36,R56 | RES, 75 OHM, ¼ W 5% |
| R55 | RES, 47 OHM, ¼ W, 5% |
| C28 | CAP, TANT, 100 UF, 6.3 V, 20%, RAD |
| C32,C33,C34 | CAP, TANT, 6.8 UF, 25 V, 10%, RAD |
| C1,C2,C3,C5,C7, C9,C10,C11,C12, C14,C16,C18 | CAP, CER, .1 UF, 50 V, 20% |
| C31 | CAP, CER, 220 PF, 10% |
| C30 | CAP, CER, 27 PF, 200 V 20% |
| C19,C20,C21,C22, C23, C27 | CAP, CER, 470 PF, 10% |
| C29 | CAP, CER, .47 UF |
| L1,L2,L3,L4,L5, L6 | INDUCTOR, CHOKE, 2.5 TURNS, FERR |
| C4,C6,C8,C13, C15,C17 | CAP, TANT, 22 UF, 15 V, 20%, RADI |
| J7,J8,J9 | HEADER, 2 PIN, RT ANGL, .09 TAIL |
| J10 | HEADER, 5 PIN, RT ANGL, .09 TAIL |
| J11 | HEADER, 6 PIN, .156, MOLEX, RT |
| J1,J2,J3,J4,J5,J6 | CONN, COAX, BNC, VERT, PC, PLAST |

The circuitry within both the schematic diagrams of FIGS. 6 and 7 should be recognizable to a practitioner of the electrical design arts in accordance with the teachings of the block diagrams shown in FIGS. 4 and 5.

Figure 8:
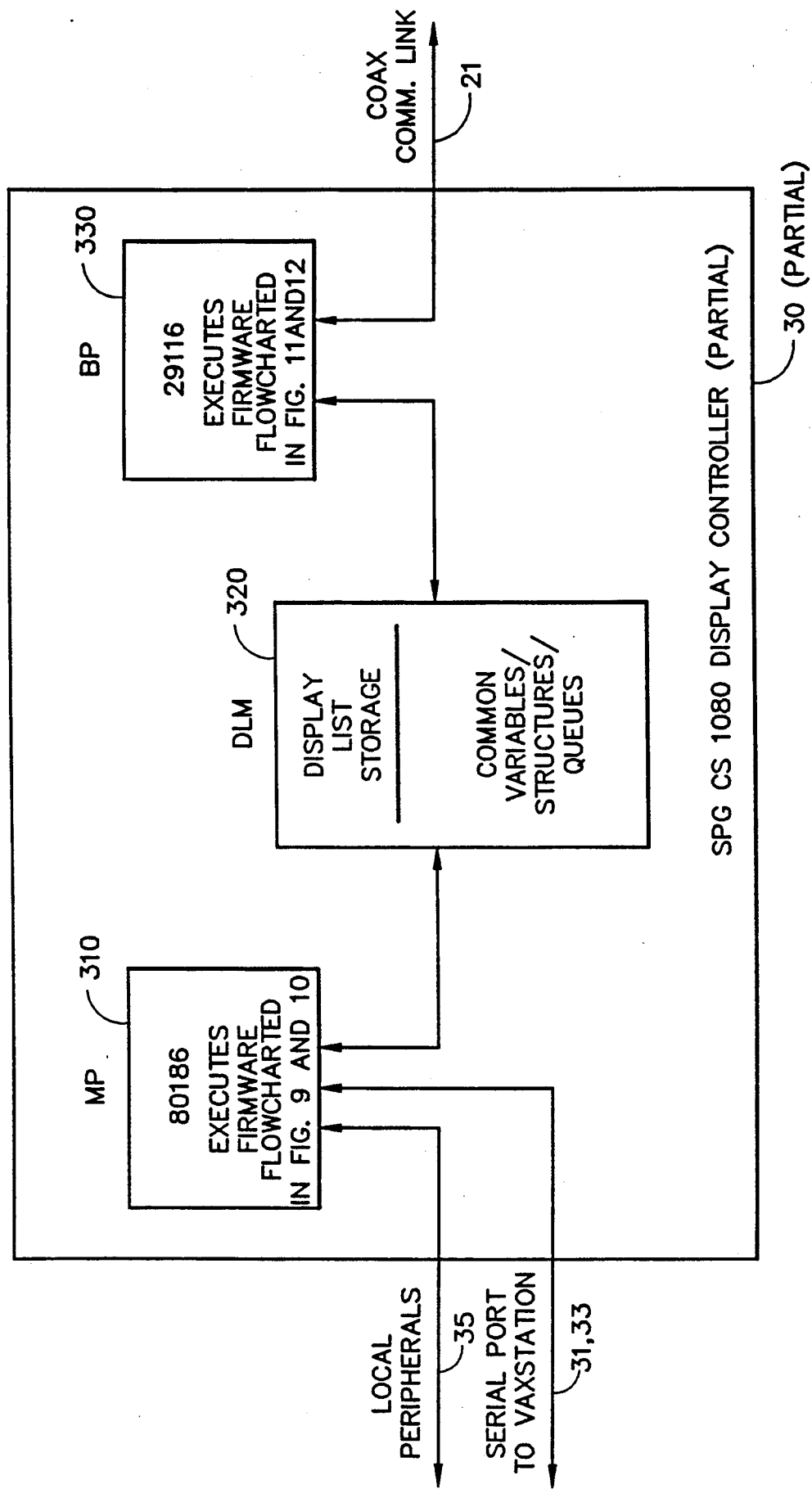
FIG. 8 is a conceptual block diagram of the organization of the firmware programs and data structures within the display controller previously shown in FIGS. 2 and 3.

A conceptual block diagrams of the organization of SPG CS 1080 display controller 30 (partial) (previously seen in FIGS. 1-3) for performing, under firmware control, necessary processing in accordance with the present invention is shown in FIG. 8. As may be recalled particularly by comparison to FIG. 3, a first, MP microprocessor 310 communicates with LOCAL PERIPHERALS and, via a typically SERIAL PORT, to the SWMC 80 that is typically a VAXstation. Meanwhile, the second BP microprocessor 330 has a typically COAXIAL COMM. LINK to the DSCC 20 and then to HC 10 (shown in FIG. 1). Both the MP microprocessor and BP microprocessor 330 operate to form information within DISPLAY LIST STORAGE (DLM) 320. The DLM 320 contains common variables and data structures and queues. The additional variables/structures/queues that are added in accordance with the present invention include a rectangle list, scaled blocks, scaled font strokes, and a video switch bit map. The organization, and development, of these added data structures will become apparent upon discussion of the following firmware flow charts.

Figure 10A:
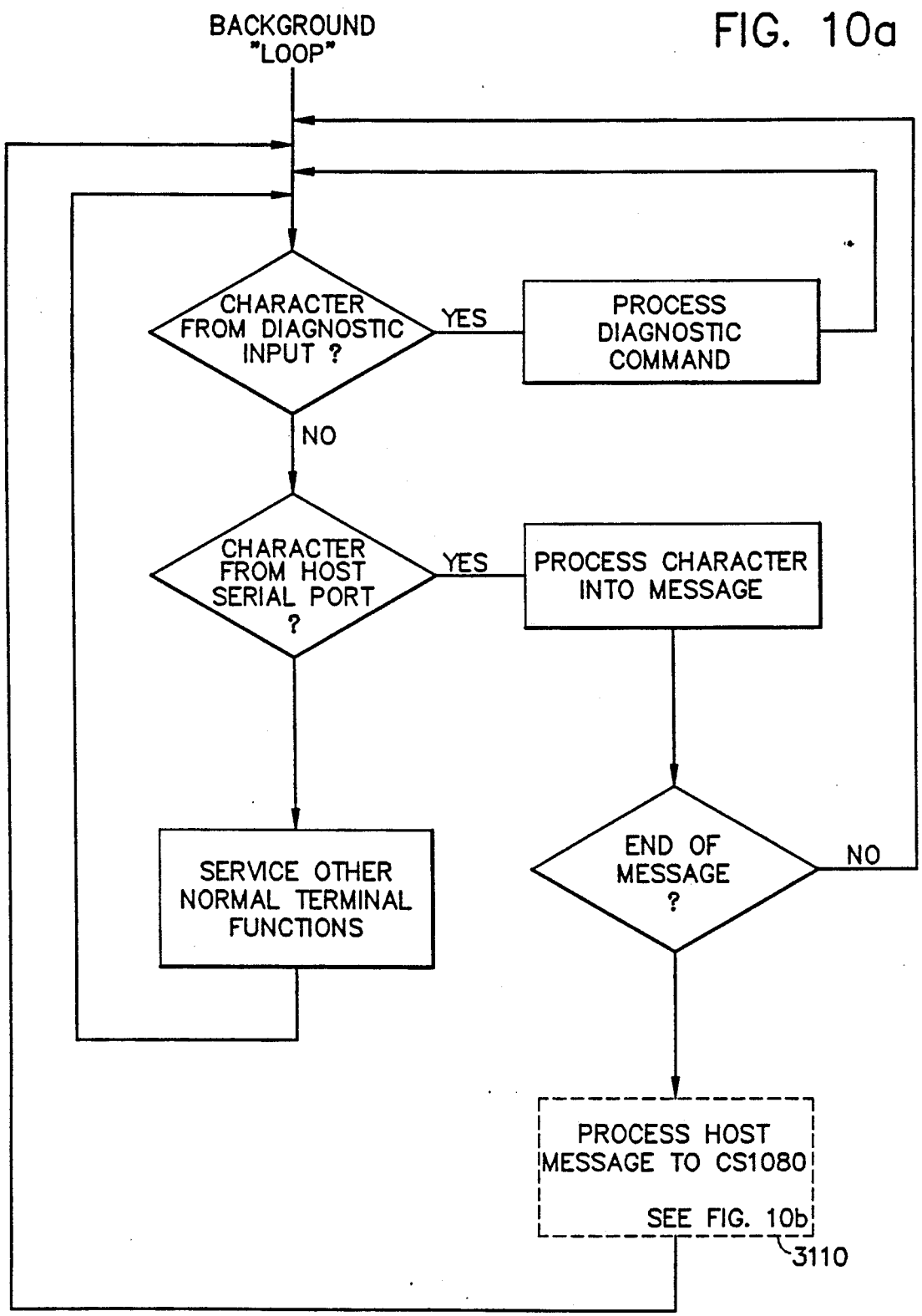
FIG. 10a is a first, "backbone" flow chart showing the locations whereat modifications/additions will be made to a second firmware routine executed by the display controller previously shown in FIGS. 2, 3 and 8.
Figure 10B:
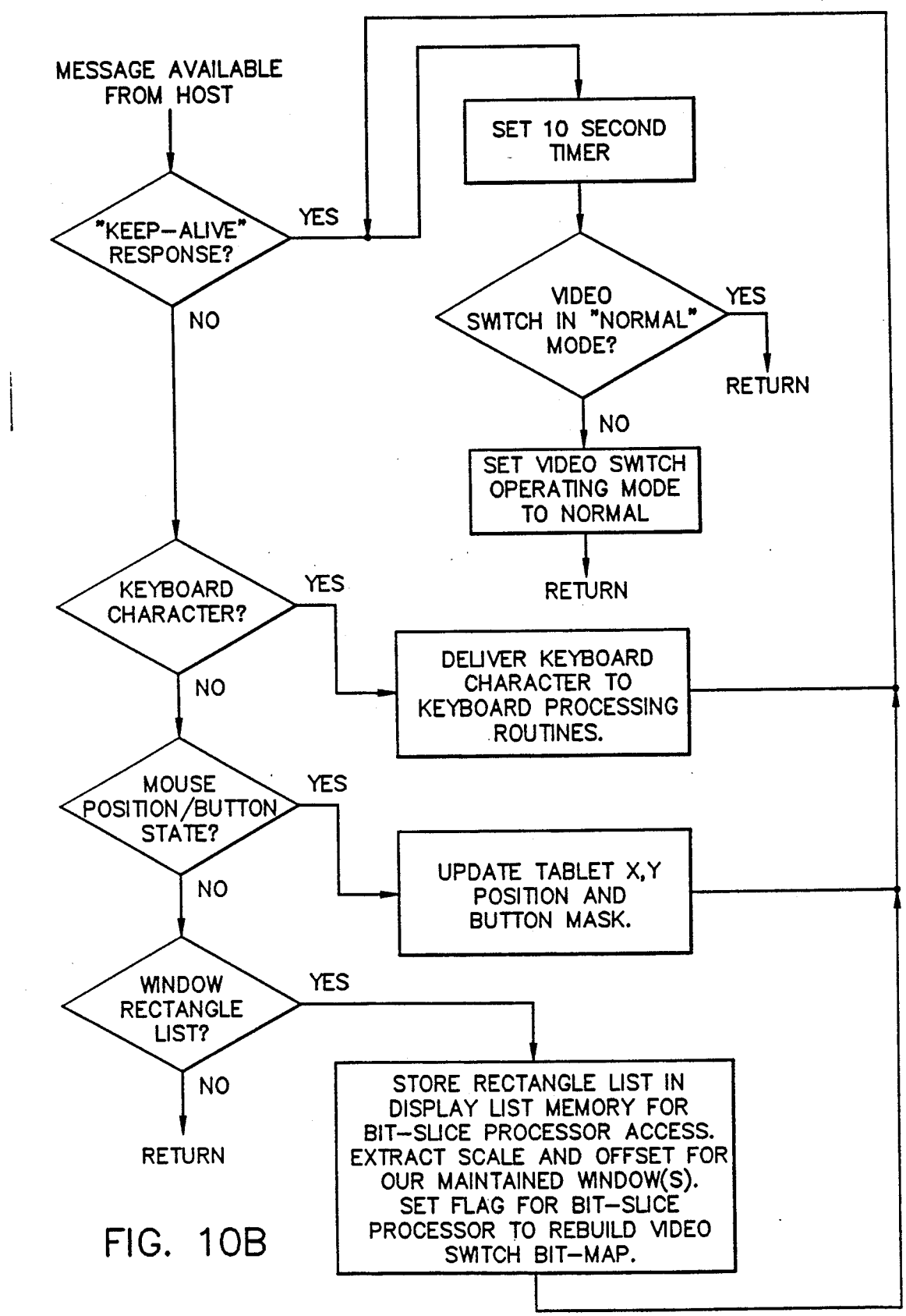
Figure 11:
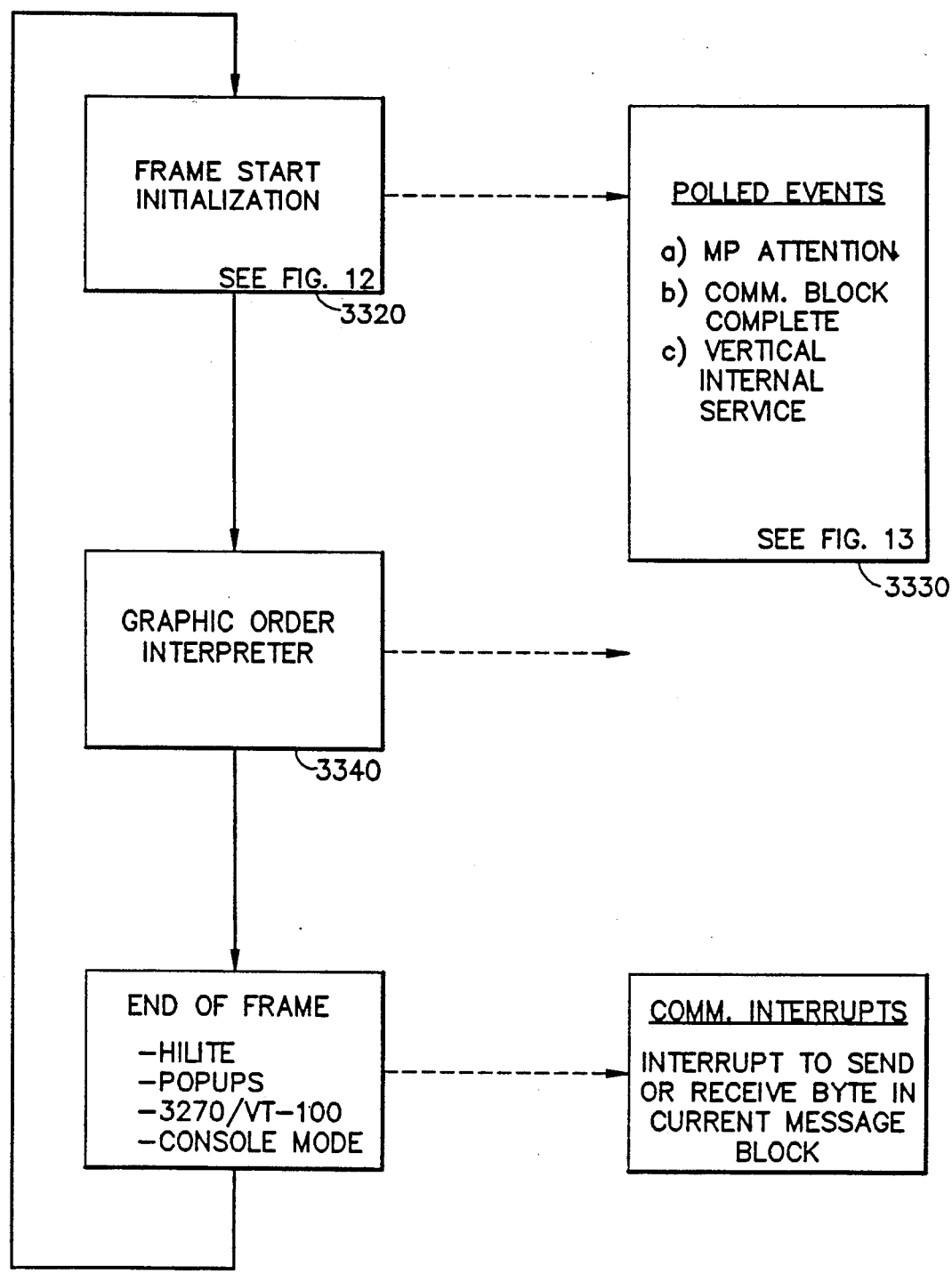
FIG. 11 is a block diagram of the firmware routines performed by a BP microprocessor of the display controller that was previously conceptually shown in FIG. 8 and that was previously shown in block diagram in FIG. 3.
Figure 12B:
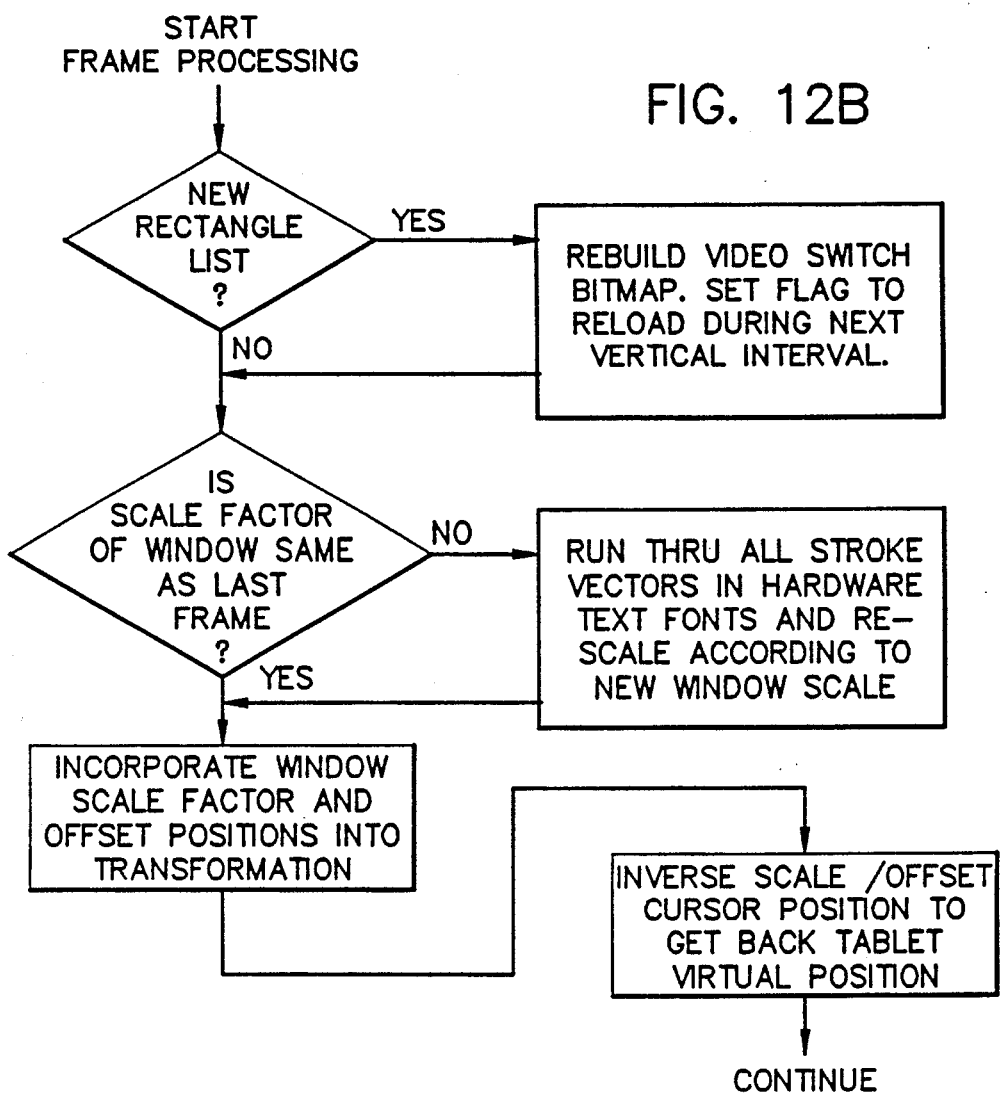
FIG. 12b is a second, detail level flow chart of the modifications/additions to that firmware routine for which the "backbone" flow chart is shown in FIG. 12a in order to realize the present invention.

As indicated on the representations of MP 310 and BP 330 in FIG. 8, the flow charts for the firmware executed by the MP microprocessor 310 will be shown in FIGS. 9 and 10, with the firmware executed by BP microprocessor 330 will be shown in FIGS. 11 and 12. Such added firmware is respectively appendicized to the present specification disclosure as Appendix 1 and Appendix 2.

Considering first the firmware executed by the MP 310 that is shown in conceptual block diagram in FIG. 8, the added/modified firmware must be executed in relation to the existing firmware that controls the function of the DISPLAY CONTROLLER 30. It will be recalled that the SPG CS 1080 DISPLAY CONTROLLER 30 (shown in FIGS. 2, 3, and 8) is derived from the previous display controller of the DS 1082GXP graphics system display (commercially available from Spectragraphics Corporation). Within the display controller of the predecessor DS 1082GXP system a sequence of processing that is flow charted in FIG. 9a proceeds upon the occurrence of a real-time clock interrupt. This flow chart of FIG. 9a represents a "backbone" upon which changes or additions are made. The firmware subroutine "check host status" illustrated in dashed line in block 3100 is newly added firmware in accordance with the present invention.

Figure 9B:
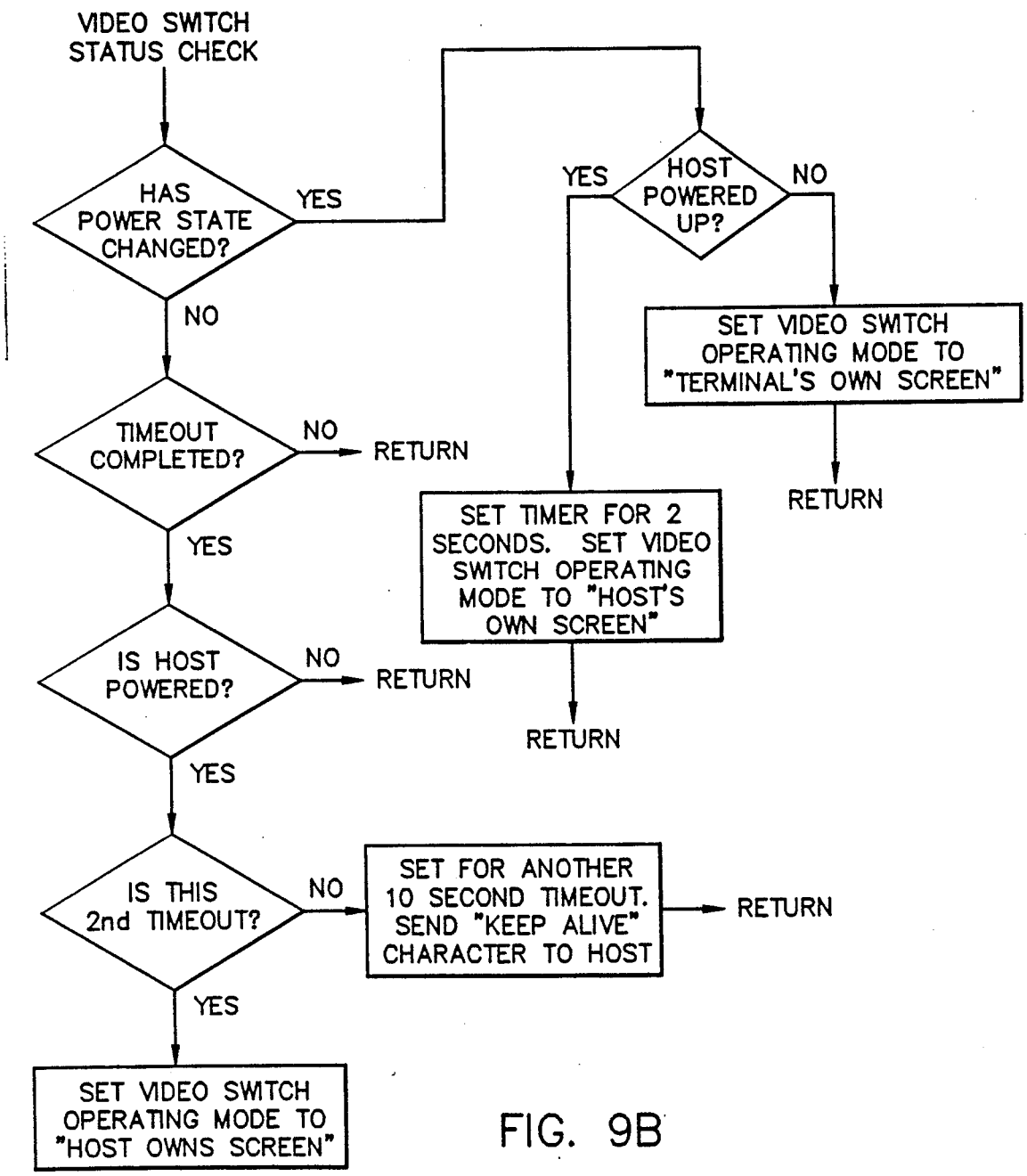

The newly added firmware performed to "check host status" is flow charted in FIG. 9b. It is concerned with implementing the "keep-alive code" function. The MP determines, via a regular real-time clock interrupt, whether the SWMC 80 (shown in FIGS. 1 and 2) is powered up, and whether windowed modification of the video output signal from DISPLAY CONTROLLER 30 is required.

There is another, second location within the standard firmware executed by MP 310 wherein modifications/additions are required in implementing system 1 in accordance with the present invention. A flow chart of a second "backbone" sequence of processing that is also normally undertaken by the DS 1082GXP display controller product of Spectragraphics, Inc. in its "background loop" is flow charted in FIG. 10a. A modification is made during the conduct of this "background loop" to "process a host message to CS 1080", as illustrated in dashed line in block 3110.

A detailed flow chart of the "process host message to CS 1080" function of block 3110 is shown in FIG. 10b. The flow charted firmware controls the MP microprocessor 310 in accordance with the present invention to maintain communications with the SWMC 80; to permit the MOUSE, KEYBOARD AND/OR OPTIONAL INPUT DEVICES 60 to substitutionarily serve as peripherals for HC 10; to size and activate the window within which data from HC 10 will be emplaced; and to perform cut/paste support by sending BP-provided raster information upon the RS232C port as CONTROL signals 31, 33 (to be transferred into other windows generated by the SWMC 80 of SWMC 80).

The "backbone" of firmware processing transpiring in BP 330 shown in FIG. 8 is more difficult to understand than is the backbone of firmware processing transpiring in MP microprocessor 310, and is correspondingly set forth in two levels of flow charts. A general, top level flow chart of the "backbone" firmware executed by the BP 330 (shown in FIG. 8) is shown in FIG. 11. Additions/modifications to the existing firmware that is within the existing DS 1082GXP display controller product of Spectragraphics Corporation transpires at blocks FRAME START INITIALIZATION 3320, POLLED EVENTS 3330 and GRAPHIC ORDER INTERPRETER 3340. The modifications taken at block 3330 include the rescaling of a font if the window size has changed, and the rescaling of the video switch bit map if a rectangle list has changed. The "backbone" firmware relative to which these modifications are accomplished is flow charted in FIG. 12a, and the actual firmware additions/modifications are flow charted in FIG. 12b.

Figure 13B:
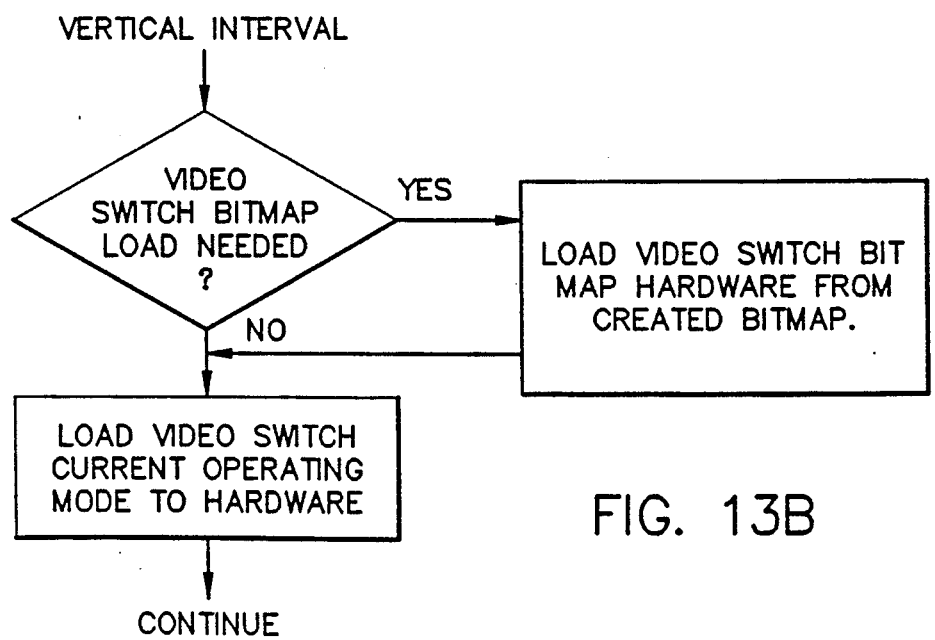
FIG. 13b is a second, detail level flow chart of the modifications/additions to that firmware routine for which the "backbone" flow chart is shown in FIG. 13a in order to realize the present invention.

Similarly, modifications to the POLLED EVENT FUNCTIONS of block 3330 involve reloading of the video switch bit map if such map is changed. The "backbone" firmware on which such modifications/additions are installed is flow charted in FIG. 13a, and the actual modifications/additions are flow charted in FIG. 13b.

The modifications to the GRAPHIC ORDER INTERPRETER of block 3340 are not of a firmware nature, and are correspondingly not flow charted. These modifications merely involve a scaling of the graphics primitives in accordance with the rescaled fonts and rescaled window size.

Figure 14:
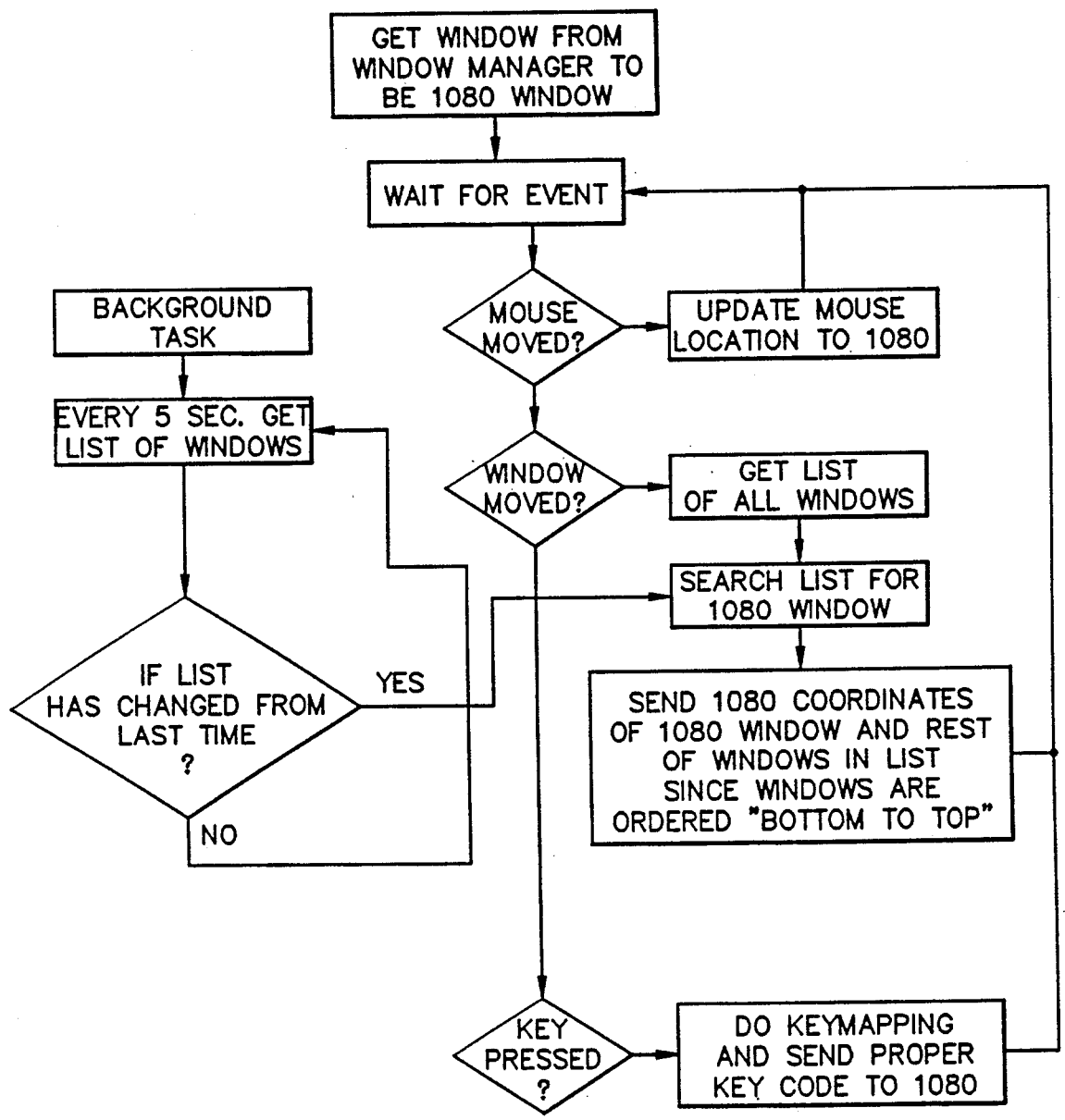
FIG. 14 is a flow chart of a software program that is executed by the system-window-managing computer previously shown in FIG. 2.

In realizing the present invention the SWMC 80, typically a DEC VAXstation operating under the VMS or ULTRIX windowing systems, executes an applications software program. The flow chart of a preferred applications software program is shown in FIG. 14. A listing of this software program in "C" code is appendicized to the present specification disclosure as Appendix 3.

The program first performs the function of an initialization. An RS232C port is opened. An "x-window" server is opened. A window for the display controller 30 is dedicated, and a watch dog timer is set up to check for the occlusion of this window (since such occlusion does not generate an event).

The main event handler of the SWMC 80 software that is flow charted in FIG. 14 handles three occurrences. When a keyboard key (part of the MOUSE, KEYBOARD AND/OR OPTIONAL INPUT DEVICES 60 shown in FIG. 1) is pressed or released then this key is mapped and sent to DC 30 via CONTROL signals 31, 33 (shown in FIG. 1). When a button of the mouse (part of MOUSE, KEYBOARD AND/OR OPTIONAL INPUT DEVICES 60 shown in FIG. 1) is pressed or released then the current position of the cursor and the identity of the button pressed is again sent to DC 30 via CONTROL signals 31, 33 to DC 30 (shown in FIG. 1). Finally, upon the exposure of a new windowed region, or upon occurrence of a watchdog alarm, all open windows are checked and updated.

A final function performed by the SWMC 80 applications software program that is flow charted in FIG. 14 is the checking of all open windows. A list of windows is received from the window server. If any information has changed concerning the window(s) dedicated to the DC 30, or those windows that are on top of the dedicated window(s), then the information for all windows, and not merely for the dedicated window(s), is communicated via CONTROL signals 31, 33 to DC 30. The current window information is updated within the user application software program running in SWMC 80. The current window information is also updated within DC 30 operating under firmware control.

The preferred binary formats for information transfer via CONTROL signals 31, 33 (typically upon an RS232C type interface) from SWMC 80 to DC 30 (shown in FIG. 1) are shown in FIG. 15a and FIG. 15b. Within the format shown in FIG. 15a, the use of the hexadecimal field "FFFF" is as follows:

| FFFF | |
|---|---|
| *1 | TABLET X VALUE |
| *2 | TABLET Y VALUE |
| 3 | KEYBOARD KEY DEPRESSION |
| *4 | *TABLET X, Y REPORT |
| *5 | *TABLET X VALUE |
| *6 | *TABLET Y VALUE |
| *7 | *TABLET BUTTON STATE |
| 8 | START WINDOW DEFINITION GROUP |
| 9 | (OPTIONAL WINDOW SELECTION) |
| A | START PIXEL DATA BLOCK |
| B | (UNUSED) |

-continued

| FFFF | |
|---|---|
| C | (UNUSED) |
| D | (UNUSED) |
| E | (UNUSED) |
| F | SPECIFY KEYBOARD TYPE |

*ALL SIGNIFY END OF TABLET SEQUENCE

The field "FFFF" contains hexadecimal value "3" to indicate the ensuing transmission of 12 binary data bits of keyboard code. If more than one keyboard is in use the keyboard type may be defined by transmission of hexadecimal value "F" within the hexadecimal field. The transmission of hexadecimal values "1", "2", "4", "5", "6", and "7" identifies corresponding information regarding the tablet, or mouse, which will next be transferred within the 12 data bits of the next two ensuing 8-bit data words. The transmission of hexadecimal value "8" within the hexadecimal field "FFFF" indicates the ensuing transmission of information regarding all the windows which are currently defined by and at SWMC 80. In this case the next two 8-bit data words are unused. Subsequent 8-bit data words follow in groups of three. The numbers of these groups is determined by the number of existent windows. Four groups each of three 8-bit words are transferred per window. The four groups per window are in the format shown in FIG. 15c. The format shown in FIG. 15b provides for 16 data bits per word group. These 16 data bits are used as shown in FIG. 15c in the communication of complete information regarding each window. The least significant 12 data bits, data bits D0–D11, are respectively used in the first through fourth word groups to communicate 1) the beginning x coordinate, 2) the x extent, the beginning y coordinate, and 4) the y extent of each window. An encoding of which quantity is at any one time, being transferred is accomplished by the setting of binary bits D12 and D13 within each word group. This encoding is for error checking purposes. Binary data bit D14 of each word group is unused. The binary data bit D15 is unused, and nominally set to 1, for transmission of the x size and y top quantities. However, this binary data bit D15 defines, for the first 16 bit transmission containing the x left information, the window owner (WO). The WO bit, binary data bit D15 of the first transmittal word group, is set to 0 if the HC 10 is to own the window and is elsewise set to 1 if the SWMC 80 is to own the window. The data bit D15 within the fourth transmitted word group is set to a binary 1 if this is the final word group for the last window to be transmitted.

In accordance with the preceding discussion, the present invention will be recognized to constitute a generalized, and generalizable, scheme for the simultaneous display of interleaved windowed graphic video information from multiple asynchronous computers on a single video monitor. Although the preferred embodiment system in accordance with the present invention has been illustrated with particular reference to two computers, alternative numbers of computers may be interfaced to a single video monitor by application of the principals of the invention. Alternatively, the present invention can be implemented in a system employing but a single computer. A single computer can interface to a monitor both through its own, direct, video channel and, indirectly, through a DesignSet communications controller and/or a display controller. The utility of so doing is that two, entirely separate, software packages (such as those performing design graphics) could be, at different times, separately and severably executed within the same program while being separately and severably controlled in the displays thereof and in the operator inputs thereto. Alternatively, networks of many computers can interface to the system of the present invention at both of its main computer communication branches. The Design Set Communications Controller 20 in particular is capable of communicating with more than one host computer.

As another parameter of variation, the present invention obviously contemplates that the division of windowed areas on a single video monitor as between two or more computers each of which produces video displays may be partitioned in other ratios than assigning all windows save one window to one computer and the last window to the remaining computer. It would be, for example, possible to roughly split the dedication of the windows by halves, or in other roughly equal proportions, between the multiple computers that are simultaneously interfaced to a single monitor.

As still another parameter of the present invention that is subject to variation, the scheme of the present invention is not limited to the simultaneous interfacing of two only computers (or nets of computers, or multiplexed computers, etc.) through two only main communications paths to the monitor. The present invention is susceptible of expansion to permit three or more computers to simultaneously each display video information within selected windows that are assigned to each upon a single video monitor. This expansion is essentially implemented by alterations of the firmware within the display controller so as to manage, scale, and position more than one windows, information. The windows, information is received upon two ports (instead of one). The contents of each window's display is received separately (although normally at different times on but a single port). As well as synchronizing a one video display output signal to an existing video display signal of a system-window-managing computer, the display controller controlling three or more computers is also tasked to perform a video switching function itself: It must output the information from the appropriate one of the multiple computers connected thereto at the appropriate time for the display of such information. Notably, the video interface module would still be required to switch between the (switched) video output of the display controller and the video output of the system-window-managing computer.

In accordance with these and other obvious modifications and adaptations of the present invention, the present invention should be interpreted broadly, in accordance with the following claims only, and not solely in accordance with that preferred embodiment within which the invention has been taught.

What is claimed is:

1. A system for simultaneously displaying information in a multiplicity of display windows upon a single monitor resultant from the simultaneous asynchronous display signals arising at a plurality of computers, the system comprising:
    a first computer running a windowed display program for producing a first video frequency analog signal bearing information suitable for display, and a signal indicating the location and size of a window reserved for display use by the second computer;
    a second computer for producing a signal bearing information suitable for display;
    a communication and display controller receiving (i) the second computer's display signal, (ii) so much of the first computer's first video frequency analog signal as permits recognition of its video synchronization, and (iii) the first computer's signal indicating the location of the reserved window,
        for outputting the second computer's display signal as a second video frequency analog signal synchronized to the first video frequency analog signal,
        for scaling and locating the informational content of the second video frequency analog signal to be within the reserved window of a display, and
        for producing a switch control signal indicating periods when each raster of the synchronized first and second video frequency analog signals is inside the reserved window;
    a video switch, receiving the synchronized first and second video frequency analog signals and the switch control signal, for gating the second video frequency analog signal when the video raster is inside the reserved window area and for gating the first video frequency analog signal at other times; and
    a display, receiving the gated synchronized first and second video frequency analog signals, for displaying a reserved window inside of which appears information from the second computer and outside of which appears information from the first computer.

2. An apparatus connectable to and usable with
    a first computer running a windowed software program for producing a first display signal,
    a second computer running a software program for producing a second display signal,
    at least one of the first display signal and the second display signal being a video frequency analog signal, and
    a video monitor producing a display in response to a received video frequency analog signal, to the end of simultaneously displaying interleaved windowed video information from both the first computer and the second computer on the video monitor, the apparatus comprising:
    first computer operational control means within the first computer for reserving a window within the running windowed software program and for producing a data signal containing information on the reserved window's position and size;
    converting/synchronizing/windowing means receiving the first and the second display signals and the data signal
        for converting the first and the second display signals to video frequency analog signals as each requires and for synchronizing both the first and the second video frequency analog display signals;
        for scaling and locating the informational content of the second video frequency analog display signal so that it will appear within the area of the reserved window, and
        for producing a switch signal upon each raster of the synchronized first and second video frequency analog display signals that indicates the periods that the video raster is outside and inside the area of the reserved window;

video switch means, receiving the first and the second video frequency analog display signals and the switch signal, for gating the first video frequency analog display signal to the video monitor during periods that the video raster is outside the area of the reserved window and for gating the second video frequency analog display signal to the video monitor upon other times.

3. A combination of, and improvement upon, selected elements from a first computer graphics workstation having a 1) first computer for running applications software in a windowing environment for causing the outputting of a a) first video frequency analog display signal, a 2) first monitor receiving the a) first video frequency analog display signal for producing windowed video displays, and from a second computer graphics and communications workstation having a (3) second computer running applications software for causing the outputting of a b) second display signal, a (4) communication and display controller receiving the b) second display signal and outputting responsively thereto a c) second video frequency analog display signal, and a (5) second monitor receiving the c) second video frequency analog display signal for producing a video display, wherein the communications and display controller and the second monitor jointly emulate a display terminal, the selective combination and improvements directed to employing computers 1) and 3), plus a modification of communications and display controller 4), plus a one of monitors 2), 5) plus a new device in a new combination so as to place the video display of computer 3) in a window appearing upon the video display of selected monitor 2), 5) while the selected monitor is otherwise displaying windows in which appear displays from computer 1), the selective combination and improvement for simultaneously putting windowed displays from two computers on a single monitor comprising:

the 1) first, system-window-managing computer running a windowing and a first applications software program for causing the outputting of the a) first video frequency analog display signal and also d) windows' locations data and e) identification of at least one window that is reserved to be filled with information from the 3) second computer via the 4) communications and display controller, the 3) second, host, computer running its applications software to cause the outputting of the b) second display signal;

a 4') modified communications and display controller running a microcode program for receiving the b) second display signal, the d) windows' locations data, the e) reserved window's identification, and at least so much of the a) first video frequency analog display signal as permits the video sync thereof to be recognized, for outputting the b) second display signal as a c') second video frequency analog display signal that is synchronized with the a) first video frequency analog display signal and that bears informational contents both scaled and offset so as to be within the location of the reserved window when the a) first video frequency analog display signal is used by the selected monitor 2), 5) to produce a video display, for producing an f) switch signal, in synchronization with both the c) second video frequency analog display signal and the a) first video frequency analog display signal, for indicating that each video frequency analog signal's raster is either inside, or outside, the location of the reserved window, a 6) video switch, receiving the a) first video frequency analog display signal from the 1) first computer and both the c') synchronized second video frequency analog display signal and the f) switch signal from the 4') modified communications and display controller, for gating the a) first video frequency analog display signal to the selected monitor 2), 5) while this a) first video frequency analog display signal is outside the location of the reserved window as a g) switched video frequency analog signal, else for gating the synchronized c') second video frequency analog display signal while this c') second video frequency analog display signal is within the location of the reserved window as the g) switched video frequency analog signal; and a selected 2), 5) monitor receiving the g) switched video frequency analog signal and for producing a video display, wherein information from the 3) second computer is inside the reserved window while information from the 1) first computer is outside the reserved window;

wherein two computers have simultaneously put windowed displays on a single monitor.

4. A method of simultaneously displaying windowed video information from two computers upon a single video monitor, comprising:

first producing, in a first system-windowing-managing computer accordance with its programmed operations 1) a first video frequency analog display signal bearing windowed-video first information, and 2) a dedicated-window information signal defining a dedicated display window where, when the first information is subsequently displayed as video, second information from a second computer may be presented;

second producing, in a second computer accordance with its programmed operations and asynchronously to the first producing, a 3) second display signal bearing second information;

converting, in a display controller also receiving the 1) first video frequency analog display signal and the 2) dedicated-window information, the 3) second display signal into a 3a) second video frequency analog display signal that has its second-information informational content scaled and located so that it will be within the dedicated window when the 1) first video frequency analog display signal bearing the first information is subsequently displayed as windowed video, and that is synchronized with the 1) first video frequency analog display signal;

generating, in the display controller in consideration of the synchronized 1) first and 3a) second video frequency analog display signals and the 2) dedicatedwindow information, a switch control signal defining the portions of each raster scan of both the synchronized 1) first and 3a) second video frequency analog display signals that are inside and outside of the area of the dedicated window;

switching, in a video switch receiving the switch control signal and the 1) first and 3a) second video frequency analog display signals, between the synchronized 1) first and 3a) second video frequency analog display signal so that the 1) first video frequency analog display signal bearing the first information from the first computer is gated upon such times as the raster scan is outside the location of the dedicated window, and so that 3a) the second video frequency analog display signal bearing the second information is gated elsetimes;

displaying, in a video monitor receiving the gated 1) first or 3a) second video frequency analog display signals, a display wherein second information from the second computer is within the dedicated display window and wherein first information from the first computer is elsewheres.

5. A method permitting a first and a second computer, each asynchronously running software generating an asynchronous display output signal, to collectively produce upon a common monitor a windowed display containing information from the first computer in some windows and information from the second computer within at least one window, the method comprising:

first producing, at a first system-window-managing computer in response to the running of a software program that reserves a display window within several display windows otherwise managed by this first computer, a video frequency analog display output first signal that contains information on the composite display of all display windows including the reserved display window, plus a output second signal that contains information on the locations and sizes of all display windows including the reserved display window;

second producing, at a second computer asynchronously with the first computer's video frequency analog display output first signal, a display output third signal that contains information suitable for display in the reserved display window but uncorrelated in either time or position with information on the reserved display window that is contained within the first computer's video frequency analog display output first signal;

receiving the second computer's display output third signal into a buffer at a display controller, from which buffer the second computer's display output third signal can subsequently be re-outputted asynchronously with its reception;

receiving into a circuit within the display controller information on the sync of the first computer's video frequency analog display output first signal;

synchronizing, by action of the display controller circuit, a re-outputting of the second computer's display output third signal as a video frequency analog display fourth signal that is in time synchronization with the first computer's video frequency analog display output first signal;

generating, in the display controller circuit that receives the video frequency analog fourth signal and is accordingly informed thereby of the common synchronization of both video frequency analog first and fourth signals, and that also receives the output second signal from the first computer; a switch control signal that indicates for each raster of the synchronized video frequency analog first and fourth signals that the video raster is or is not within the image area of reserved display window;

switching, in a video switch circuit receiving the first computer's video frequency analog display output first signal plus receiving the synchronized video frequency analog display fourth signal derived from the second computer's display output third signal via the display controller plus receiving the switch control from the display controller circuit, between the video frequency analog first and fourth signals to produce a composite video frequency analog display fifth signal that contains information from the first computer in all regions save the reserved display window and that contains information from the second computer in the reserved display window, displaying on a monitor receiving the composite video frequency analog display fifth signal a windowed display that includes windows containing information from the first computer plus a reserved display window that contains information from the second computer.

6. A system for the simultaneous display of windowed interleaved video information upon a single video monitor from a plurality of sources comprising:

two computer means at least one of which is managing a windowed display for collectively producing two asynchronous display signals at least one of which is a video frequency analog signal plus, from at least that first one of the two computer means managing the windowed display, a data signal bearing information on the position and size of a window dedicated to the remaining one of the two computer a buffering/converting and synchronizing; positioning and scaling means receiving the two asynchronous display signals and the data signal, for buffering either or both of the two display signals as required, and for converting a remaining one display signal to a video frequency analog signal as required, in order to produce two synchronized video frequency analog display signals, for positioning and scaling the informational content of that video frequency analog display signal from or converted from the second one of the two computer means, as the case may be, so that is entirely positioned and sized within the dedicated window, and for producing a switch control signal indicating the portion of each of the two synchronized video frequency analog display signals that is inside, and the portion that is outside, the dedicated window;

a video switch means receiving the synchronized video frequency analog display signals and the switch control signal for gating a one of the video frequency analog display signals when it is outside the dedicated window and the other one of the video frequency analog display signals when it is inside the dedicated window;

a display means receiving the gated video frequency analog display signals for producing a video display;

wherein information from the one of the two computer means managing the windowed display is displayed outside the dedicated window while information from the other one of the two computer means is displayed inside the dedicated window upon the video display.

7. An imaging system for displaying information from a first source outside a window, and information from a second source inside a window, in a windowed display, the system comprising:
- a first source of a video frequency analog display signal;
- a second source of a non-video frequency analog display signal;
- wherein one of the first and the second sources is managing a windowed display and further produces a signal bearing information on a window dedicated to the other one of the first and second sources;
- an imaging means receiving the first-source video display signal, the second-source non-video frequency analog display signal, and the signal bearing information on the dedicated window for producing a composite video frequency analog signal;
- wherein an image from the second-source non-video frequency analog display signal is inside the dedicated window, and an image excepting an image of the dedicated window is outside the dedicated window, when the composite video frequency analog signal is displayed;
- display means for displaying the composite video frequency analog signal.

* * * * *